United States Patent
Kelch et al.

(10) Patent No.: US 11,086,142 B2
(45) Date of Patent: Aug. 10, 2021

(54) PROGRESSIVE SPECTACLE LENS WITH REGIONALLY VARYING REFRACTIVE INDEX AND METHOD FOR THE DESIGN OF SAME

(71) Applicant: Carl Zeiss Vision International GmbH, Aalen (DE)

(72) Inventors: Gerhard Kelch, Aalen (DE); Christoph Menke, Oberkochen (DE); Helmut Wietschorke, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 17/153,581

(22) Filed: Jan. 20, 2021

(65) Prior Publication Data

US 2021/0141244 A1    May 13, 2021

Related U.S. Application Data

(63) Continuation of application No. PCT/EP2019/069422, filed on Jul. 18, 2019.

(30) Foreign Application Priority Data

Jul. 20, 2018 (EP) .................... 18184779

(51) Int. Cl.
    G02C 7/06       (2006.01)
(52) U.S. Cl.
    CPC ............ G02C 7/065 (2013.01); G02C 7/068 (2013.01)
(58) Field of Classification Search
    CPC ................ G02C 7/065; G02C 7/068
    (Continued)

(56) References Cited

U.S. PATENT DOCUMENTS

| 5,042,936 A | 8/1991 | Guilino et al. |
| 8,186,829 B2 | 5/2012 | De Rossi et al. |

(Continued)

FOREIGN PATENT DOCUMENTS

| EP | 2177943 A1 | 4/2010 |
| EP | 3312661 A1 | 4/2018 |

(Continued)

OTHER PUBLICATIONS

Industrial Norm "Ophthalmic optics—Uncut finished spectacle lenses—Part 2: Specifications for power-variation lenses," ISO 8980-2, May 2004.

(Continued)

*Primary Examiner* — James R Greece
(74) *Attorney, Agent, or Firm* — Thrive IP®; Georg M. Hasselmann; Georg Hasselmann

(57) ABSTRACT

A progressive spectacle lens includes a substrate which has a front face and a rear face and is made from a material with a regionally varying refractive index, wherein the front face and/or the rear face has/have a free-form surface geometry. The progressive spectacle lens complies with the following optical requirements: (1) a prescribed dioptric power in the distance reference point within the permissible limit deviations in accordance with EN ISO 8980-2:2004 and a prescribed dioptric power in the near reference point within the permissible limit deviations in accordance with EN ISO 8980-2:2004, (2) a monotonically steady increase in the dioptric power between the distance reference point and near reference point along a principal line of vision, and (3) a progression channel. The progressive spectacle lens has a free-form surface geometry of the front face and/or rear face.

19 Claims, 13 Drawing Sheets

(58) Field of Classification Search
USPC .................................................. 351/159.42
See application file for complete search history.

(56) References Cited

U.S. PATENT DOCUMENTS

| | | |
|---|---|---|
| 2003/0117578 A1 | 6/2003 | Haimerl et al. |
| 2010/0238400 A1* | 9/2010 | Volk .................. G02C 7/061 351/159.42 |
| 2019/0250430 A1 | 8/2019 | Mappes et al. |

FOREIGN PATENT DOCUMENTS

| | | |
|---|---|---|
| WO | 8904986 A1 | 6/1989 |
| WO | 9913361 A1 | 3/1999 |

OTHER PUBLICATIONS

Industrial Norm "Ophthalmic optics—Spectacle lenses—Vocabulary (ISO 13666:2012)," German and English version EN ISO 13666:2012, Oct. 2013.

Industrial Norm "Ophthalmic optics—Terms and definitions related to free-form technology," German and English version DIN SPEC 58194, Dec. 2015.

Minkwitz "Über den Flächenastigmatismus bei gewissen symmetrischen Asphären [Surface astigmatism of certain symmetrical aspheres]," Optica Acta, 10(3), No. 3 Jul. 1963, pp. 223-227.

Diepes et al. "Flächenastigmatismus [Surface astigmatism]," Optik und Technik der Brille, 2nd edition, Heidelberg 2005, p. 256.

Diepes et al. "Der Satz von Minkwitz [Minkwitz's theorem]," Optik und Technik der Brille, 2nd edition, Heidelberg 2005, pp. 257 to 258.

Shitanoki; "Application of Graded-Index for Astigmatism Reduction in Progressive Addition Lens," Applied Physics Express, p. 032401, 2009.

Internet citation "Advanced Nanolayered Thin Films for Optics," available at http://peaknano.com/wp-content/uploads/PEAK-1510-GRINOptics-Overview.pdf, last accessed Jan. 12, 2017.

Extended European Search Report issued in EP 18184779.8, to which this application claims priority, dated Dec. 5, 2018.

International Search Report issued in PCT/EP2019/069422, to which this application claims priority, dated Oct. 9, 2019, and English-language translation thereof.

Written Opinion issued in PCT/EP2019/069422, to which this application claims priority, dated Oct. 9, 2019.

International Preliminary Examination Report issued in PCT/EP2019/069422, to which this application claims priority, dated Feb. 24, 2021, and English-language translation thereof.

* cited by examiner

PROGRESSIVE SPECTACLE LENS WITH REGIONALLY VARYING REFRACTIVE INDEX AND METHOD FOR THE DESIGN OF SAME

CROSS REFERENCE TO RELATED APPLICATIONS

This application is a continuation application of international patent application PCT/EP2019/069422, filed Jul. 18, 2019, designating the United States and claiming priority from European patent application EP 18184779.9, filed Jul. 20, 2018, and the entire content of both applications is incorporated herein by reference.

TECHNICAL FIELD

The disclosure relates to a product comprising (a) a progressive power spectacle lens or (b) a representation of the progressive power spectacle lens in the form of computer-readable data situated on a data medium or (c) a data medium with a virtual representation of the progressive power spectacle lens in the form of computer-readable data, according to the preamble of patent claim 1, and to a computer-implemented method for designing a progressive power spectacle lens according to the preamble of patent claim 4.

BACKGROUND

In spectacle lens optics, progressive power spectacle lenses have been known and prevalent for decades. Like multifocal spectacle lenses (generally bifocal and trifocal spectacle lenses), these provide additional optical power for the presbyopic user in the lower portion of the spectacle lens for the purposes of observing close objects, e.g., when reading. This additional optical power is required since the lens of the eye loses its property of focusing on near objects more and more with increasing age. Compared to these multifocal spectacle lenses, progressive power spectacle lenses offer the advantage of providing a continuous increase in the optical power from the distance portion to the near portion such that sharp vision is ensured not only in the distance and nearby, but also at all intermediate distances.

In general, progressive power spectacle lenses have previously been produced from a material with a constant refractive index; i.e., the optical power of the spectacle lens is only set by the corresponding shaping of the two air-adjoining surfaces (front or object-side surface and back or eye-side surface) of the spectacle lens. In order to produce the continuous increase of the optical power in a progressive power spectacle lens, a corresponding continuous change in the surface curvature must be present on at least one of the two lens surfaces. Differential-geometric properties of surfaces which are at least twice continuously differentiable however inextricably lead to unwanted optical imaging aberrations in the case of progressive power spectacle lenses made of a material with a constant refractive index.

These properties are traced back to "Minkwitz's theorem" (Minkwitz, G., "Über den Flächenastigmatismus bei gewissen symmetrischen Asphären.", Optica Acta, 10(3), No. 3 July 1963, pp. 223-227). Minkwitz states that, on an at least twice continuously differentiable surface to the side of a line of umbilics with a continuously increasing or decreasing curvature, the surface astigmatism changes twice as quickly as the curvature along this line. At each point of the surface, the surface astigmatism is the absolute value of the difference of the principal curvatures of the surface at this point multiplied by the refractive index difference in front of and behind the surface at the surface point. For the definition of surface astigmatism and mean surface refractive power, see: Diepes H., Blendowske R., "Optik and Technik der Brille", 2nd edition, Heidelberg 2005, p. 256.

This surface astigmatism produces an unsharpness in the optical power of the spectacle lens for the wearer which cannot be compensated by the eye. Consequently, all progressive power spectacle lenses produced in the aforementioned way are afflicted with imaging aberrations (residual astigmatism) to the side of the region of sharp vision, referred to as the "intermediate corridor", in the distance to near transition. More precisely, the relationship between the increase of the mean surface refractive power along the line of umbilics and the lateral surface astigmatism indicated thereby, in accordance with Minkwitz's theorem, largely corresponds to the relationship between the vertical dioptric power increase in the progressive power spectacle lens and the lateral increase in the astigmatic aberration (residual astigmatism), indicated thereby, for the spectacle wearer in the intermediate corridor. Here, pursuant to DIN EN ISO 13666:2012, section 14.1.25, the intermediate corridor is the region of a progressive power spectacle lens providing clear vision for ranges intermediate between distance and near. The vertical dioptric power increase is understood to be the increase in the mean power of the spectacle lens for the spectacle wearer in the intermediate corridor in the vertical direction. In the near region, the mean power of the distance region plus the prescribed addition power is obtained. At each visual point of the progressive power spectacle lens, a focusing effect consisting of two principal meridian refractive powers emerges for the spectacle wearer in the corresponding viewing direction along the principal ray. The arithmetic mean of these principal meridian refractive powers is the mean power.

The principal line of sight, which represents the totality of all visual points through the surface during the gazing movement of the eye on object points straight in front of the spectacle wearer from distance to near, extends through the center of the intermediate corridor. FIG. 1 illustrates this relationship. The symbol $\Delta \text{Add}$ in the drawing is the gradient of the mean power in the direction of the line of umbilics. The symbol $\Delta \text{Cyl}$ in the drawing is the gradient of the astigmatism. The symbol N indicates the curve of the line of umbilics. Astigmatism is understood here to mean the astigmatic deviation from the astigmatic power prescribed for the spectacle wearer taking account of the axis.

The calculation of mean power and astigmatic deviation at a visual point on the spectacle lens is implemented in the spectacle wearer beam path. This beam path describes the light path along the principal ray, which connects the object point gazed at by the spectacle wearer to the eye's center of rotation.

Hence, a simple relationship is provided between the power increase in the progressive power spectacle lens and the width of the intermediate corridor, within which sharp vision is possible. Overcoming this law is very desirable since a wider intermediate corridor means a significant improvement in the usability of the lens for vision at intermediate distances. Regarding Minkwitz's theorem, see also: Diepes H., Blendowske R., "Optik and Technik der Brille," 2nd edition, Heidelberg 2005, p.257f.

WO 89/04986 A1 considers the use of materials with a variable refractive index in progressive power spectacle lenses. On page 3, it specifies three options for using a varying refractive index, specifically:

By varying the refractive index, the power increase is generated or amplified along a line which follows the curved principal line of sight or which lies in a plane and is adapted to the principal line of sight.

Here, the principal line of sight denotes that line on the front surface of the spectacle lens which interconnects the principle visual points for distance and near vision and on which the intersection points of the visual rays for intermediate distances lie in the "straight-ahead" direction. The principal line of sight is a line that extends approximately perpendicular in the distance and near portion and is wound in the intermediate portion.

The astigmatism along the principal line of sight is rectified in full or in part as a result of the varying refractive index.

Corrections of imaging aberrations to the side of the principal meridian are undertaken by using a gradient medium.

If the three effects "power increase along the principal line of sight," "removal of the astigmatism along the principal line of sight," and "lateral corrections" are considered as predominantly partly or not related to the variation of the refractive index, then there is a total of $3^3=27$ combination options, all of which can be characterized mathematically.

The object of WO 89/04986 A1, specified in the penultimate paragraph of page 2, consists of "it being possible to obtain such great advantages by the use of a varying refractive index during the production of the lens surfaces that, overall, a simplified production arises with comparable imaging properties."

Page 5 of WO 89/04986 A1 also briefly discusses Minkwitz's theorem:

"If the astigmatism is additionally also reduced along the principal meridian as a result of the variation in the refractive index, this means that the restriction when forming the spectacle lens of the surface astigmatism having to be small along the principal meridian or the principal line of sight is also dispensed with, and so the spectacle lens according to the disclosure is not subject to Minkwitz's theorem and the spectacle lens can be formed substantially more cost-effectively under other aspects."

Overall, WO 89/04986 A1 emphasizes the simpler and more cost-effective producibility of the spectacle lenses with comparable imaging properties. The mentioning of improved imaging properties at the top of page 12 remains in approximate terms:

"Express reference should be made to the fact that the correction of imaging aberrations has not been taken into account during the optimization and that, nevertheless, lenses with very good imaging properties in the lateral regions have emerged. A further improvement in the imaging properties in the regions laterally to the principal meridian is obtained by further optimization of the index function. No improvements to the side of the intermediate corridor in relation to conventional lenses are identifiable in the examples."

WO 99/13361 A1 describes a so-called "MIV" lens object, which is intended to have all functional features of progressive power lenses, specifically a distance portion, a near portion and a progressive zone, but whose edge regions should be free from astigmatic aberrations. This document describes that such a lens object may comprise a spherical front surface and a spherical back surface. The lens object should comprise a progressive zone with a refractive index that continuously increases from the distance portion to the near portion. However, as a rule, it is not possible to realize all desired addition powers in such an embodiment. Therefore, the document explains: "If desired, the range of addition powers can be bridged, in case that is impossible by the sole variable refraction index, also by manufacturing the lenses with a variable refraction index material rough block, as described above, and forming variable geometry curves as the traditional progressive lenses thus obtaining the result of having far higher performances in comparison to these latter ones, because the lens, having different refraction indexes in the different areas, will allow to reach the desired addition power by using much less differentiated curves between the far sight and the near sight with a reduction of the aberration area and an increase of the useful sight area."

US 2010/0238400 A1 describes progressive power spectacle lenses consisting of a plurality of layers in each case. At least one of the layers may have a varying refractive index, which is described with respect to two meridians that extend orthogonal to one another. Moreover, at least one of the surfaces of one of the layers may have a progressive surface form. It describes that the refractive index profile in the horizontal direction can be used for the full correction of the by the geometry of the surfaces.

Yuki Shitanoki et al.: "Application of Graded-Index for Astigmatism Reduction in Progressive Addition Lens," Applied Physics Express, Vol. 2, Mar. 1, 2009, page 032401, describes, by the comparison of two progressive power spectacle lenses molded with the aid of the same mold shell, the astigmatism in the case of a progressive power spectacle lens with a refractive index gradient can be reduced compared with a progressive power spectacle lens without a refractive index gradient.

EP 2 177 943 A1 describes a method for calculation by optimization of an optical system, for example an ophthalmic lens, according to at least one criterion from a list of criteria that influence a subject's visual impression. The document proposes minimizing a cost function taking account of target values and criterion values. A general formula for such a cost function is specified. The following two examples, inter alia, are specified:

Paragraph [0016]: "In one embodiment, the optical working system to be optimized comprises at least two optical surfaces and the modified parameters are at least the coefficients of the equations of two optical surfaces of the optical working system."

Paragraph [0018]: "In one embodiment, in which the optical system to be optimized comprises at least two optical surfaces, the modification of the optical working system is carried out in such a way that at least the index of the optical working system is modified. It is possible to manufacture a lens from an inhomogeneous material in which a gradient is present in the refractive index (this is known as a GRIN lens). By way of example, the distribution of the optimized index can be axial or radial and/or can depend on the wavelength."

SUMMARY

It is an object of the present disclosure to significantly improve the imaging properties of progressive power spectacle lenses in comparison with the related art. In so doing, the restrictions as a result of Minkwitz's theorem, in particular, should be reduced and removed where possible.

This object is achieved by means of a product having the features of claim 1 and a method having the features of claim 4. Advantageous embodiments and developments are the subject matter of the dependent claims.

Specifically, materials with a variable refractive index (GRIN) are used to achieve the object. In contrast to WO 89/04986 A1, a simplification of the surface geometry is precisely not sought after in this case.

By contrast, the inventors have determined that substantial improvements in the imaging quality over the related art are only obtained by simultaneous optimization of the distribution of the refractive index and the form of a free-form surface. This applies in particular in the regions to the side of the intermediate corridor.

The disclosure is directed to the following three exemplary embodiments:

(1) The refractive index varies only in a first spatial dimension and in a second spatial dimension and is constant in a third spatial dimension, wherein a distribution of the refractive index in the first spatial dimension and the second spatial dimension has neither a point symmetry nor an axial symmetry;

(2) The refractive index changes in a first spatial dimension and in a second spatial dimension and in a third spatial dimension. A distribution of the refractive index in the first spatial dimension and the second spatial dimension in all planes perpendicular to the third spatial dimension has neither a point symmetry nor an axial symmetry; and (3) The refractive index changes in a first spatial dimension and in a second spatial dimension and in a third spatial dimension. A distribution of the refractive index has no point symmetry and no axial symmetry at all.

In one exemplary embodiment of the disclosure, the third spatial dimension in case (1) or (2) extends in a direction which:

differs by not more than 5° from the main fixation direction during use as intended or differs by not more than 10° from the main fixation direction during use as intended or differs by not more than 20° from the main fixation direction during use as intended or differs by not more than 5° from the principal viewing direction during use as intended or differs by not more than 10° from the principal viewing direction during use as intended or differs by not more than 20° from the principal viewing direction during use as intended or differs by not more than 5° from the direction of the normal vector of the front surface in the geometric center of the progressive power spectacle lens or differs by not more than 10° from the direction of the normal vector of the front surface in the geometric center of the progressive power spectacle lens or differs by not more than 20° from the direction of the normal vector of the front surface in the geometric center of the progressive power spectacle lens or differs by not more than 5° from the direction of the normal vector at the prism measurement point or differs by not more than 10° from the direction of the normal vector at the prism measurement point or differs by not more than 20° from the direction of the normal vector at the prism measurement point or differs by not more than 5° from the direction of the normal vector at the centration point or differs by not more than 10° from the direction of the normal vector at the centration point or differs by not more than 20° from the direction of the normal vector at the centration point.

Pursuant to DIN EN ISO 13666:2013-10-14.2.12, the prism measurement point (in the case of a progressive power spectacle lens or a progressive power spectacle lens blank) is a point on the front surface, stipulated by the manufacturer, at which the prismatic effects of the finished lens have to be determined The definition of the centration point is found in section 5.20 in DIN EN ISO 13666:2013-10.

According to the disclosure, the free-form surface is typically a free-form surface in the narrower sense, corresponding to section 2.1.2 of the DIN SPEC 58194, dated December 2015, specifically a spectacle lens surface manufactured using free-form technology, which is described mathematically within the limits of differential geometry and which is neither point symmetric nor axially symmetric.

The reduction in the residual astigmatism to the side of the intermediate corridor so that the width of the intermediate corridor increases should be considered to be a substantial improvement. This width is defined by a bound of the residual astigmatism, which is perceived as irritating by the spectacle wearer. This bound usually lies in the range between 0.25 diopters and 0.50 diopters. Furthermore, it is also possible to reduce the maximum residual astigmatism in the intermediate region, typically at a horizontal distance of 20 mm from the principal line of sight.

These substantial improvements are precisely also obtained for a progressive power lens which has a non-symmetrical (optical) design, i.e., its distribution of the residual astigmatic and spherical aberrations for the spectacle wearer has no axial symmetry over the entire spectacle lens, caused by adapting the design to the convergence movement of the eye of the spectacle wearer during near vision.

Following the optimization according to the disclosure, a progressive power spectacle lens arises, which has at least one free-form surface and a non-constant, generally non-symmetric distribution of the refractive index in the lens.

According to the disclosure, this progressive power spectacle lens is characterized in a first alternative by virtue of the fact that it does not meet the optical requirements of the spectacle wearer as per the prescription if, while maintaining the geometry of the bounding surfaces, the GRIN material is replaced by a material with a constant refractive index.

Expressed differently, the subject matter of the disclosure consists in a product comprising:

a) a progressive power spectacle lens and instructions for using the progressive power spectacle lens or b) a representation of the progressive power spectacle lens situated on a data medium in the form of computer-readable data and instructions for using the progressive power spectacle lens or c) a data medium with a virtual representation of the progressive power spectacle lens in the form of computer-readable data and instructions for using the progressive power spectacle lens or d) a representation of the progressive power spectacle lens in the form of a computer-readable data signal and instructions for using the progressive power spectacle lens, wherein the progressive power spectacle lens comprises a substrate with a front surface and a back surface, said substrate consisting of a material with a spatially varying refractive index, the front surface and/or the back surface have/has a free-form surface geometry, the progressive power spectacle lens has a distance design reference point and a near design reference point, the progressive power spectacle lens satisfies the following optical requirements:

(1) a prescribed dioptric power at the distance design reference point lies within the admissible limit deviations pursuant to DIN EN ISO 8980-2:2004 and a prescribed dioptric power at the near design reference point lies within the admissible limit deviations pursuant to DIN EN ISO 8980-2:2004,
(2) the dioptric power monotonically continuously increases between distance design reference point and near design reference point,
(3) there is an intermediate corridor, which is defined by virtue of the residual astigmatism lying below a value from the group of
  (a) 0.25 diopters
  (b) 0.38 diopters
  (c) 0.50 diopters.

According to the disclosure, the free-form surface geometry of the front surface and/or the back surface of the progressive power spectacle lens and the spatial variation of the refractive index are adapted to one another in such a way in this alternative that a comparison progressive power spectacle lens with the same geometry but a spatially non-varying refractive index does not satisfy at least one of the aforementioned optical requirements (1) to (3).

Within the scope of the present disclosure, the expression "a representation of a progressive power spectacle lens situated on a data medium" is understood to mean, for example, a representation of the progressive power spectacle lens stored in a memory of a computer.

Instructions for using the progressive power spectacle lens denote, in particular, the position and the orientation of the progressive power spectacle lens or of the spectacles in which the progressive power spectacle lens has been inserted, in relation to the eyes and the face of the wearer while the spectacles are worn. By way of example, the use conditions can be specified by the "as-worn" pantoscopic angle (DIN ISO 13666:2013-10, section 5.18), the face form angle (DIN ISO 13666:2013-10, section 17.3) and the vertex distance (DIN ISO 13666:2013-10, section 5.27). Typical values for the "as worn" pantoscopic angle lie between −20 degrees and +30 degrees; typical values for the vertex distance lie in the range between 5 mm and 20 mm; and typical values for the face form angle lie in the range between −5 degrees and +30 degrees. In addition to the "as worn" pantoscopic angle, the face form angle and the vertex distance, the use conditions, as a rule, also include the interpupillary distance pursuant to DIN ISO 13666:2013-10, section 5.29, i.e., distance between the centers of the pupils when the eyes are fixating an object at an infinite distance in the straight-ahead position, and the centration data, i.e., the dimensions and distances required to center the spectacle lens in front of the eye, and the object distance model, which sets the object distance for which a certain point on the spectacle lens surface is optimized.

Pursuant to DIN ISO 13666:2013-10, section 5.18, the "as-worn" pantoscopic angle is the angle in the vertical plane between the normal to the front surface of a spectacle lens at its boxed center and the line of sight of the eye in the primary position, usually taken to be the horizontal.

Pursuant to DIN ISO 13666:2013-10, section 17.3, the face form angle is the angle between the plane of the spectacle front and the plane of the right lens shape, or of the left lens shape.

Pursuant to DIN ISO 13666:2013-10, section 5.27, the vertex distance is the distance between the back surface of the spectacle lens and the apex of the cornea, measured with the line of sight perpendicular to the plane of the spectacle front.

Pursuant to DIN ISO 13666:2013-10, section 17.1, the plane of the lens shape is the plane tangential to the front surface of a plano or demonstration or dummy lens at its boxed center, when mounted in the frame.

Pursuant to DIN ISO 13666:2013-10, section 17.2 the plane of the spectacle front is the plane containing the two vertical centerlines of the right and left boxed lens shapes.

The representation of the progressive power spectacle lens can comprise, in particular, a description of the geometric form and of the medium of the progressive power spectacle lens. By way of example, such a representation may comprise a mathematical description of the front surface, the back surface, the arrangement of these surfaces with respect to one another (including the thickness) and the edge of the progressive power spectacle lens, and the refractive index distribution of the medium of which the progressive power spectacle lens should consist. The representation can be present in encoded form or even in encrypted form. Here, medium means the material/materials or the substance used to manufacture the progressive power spectacle lens. The progressive power spectacle lens may also consist of a plurality of layers, for example also of an extremely thin glass with a thickness of between 10 µm and 500 µm and plastic applied thereon.

Pursuant to section 9.3 of DIN EN ISO 13666:2013-10, dioptric power is the general term comprising the focal power and the prismatic power of a spectacle lens. Accordingly, it regularly comprises the data for the dioptric power, consisting of spherical power, cylindrical power, axis of the cylindrical power and addition power, which are required to correct the refractive error of the spectacle wearer. At the measurement points, specifically the design reference points pursuant to DIN EN ISO 13666:2013-10 of the progressive power spectacle lens, the measurement values must observe the tolerances set pursuant to the standard DIN 8980-2:2004. This should also apply to the prescription powers for the spectacle wearer at the reference points. The curve of this continuous gradient and the progression length are set by the selection of the glass type (glass design) by the spectacle wearer.

Pursuant to 14.2.1 of DIN EN ISO 13666:2013-10 addition power is understood to mean the difference between the vertex power of the near portion and the vertex power of the distance portion, measured under specified conditions. 11.1 of DIN EN ISO 13666:2013-10 defines a spherical-power spectacle lens as a spectacle lens which brings a paraxial pencil of parallel light to a single focus. Section 12.1 of the standard defines an astigmatic-power spectacle lens as a spectacle lens bringing a paraxial pencil of parallel light to two separate line foci mutually at right angles and hence having vertex power in only the two principal meridians. Pursuant to 11.2, the spherical power or sphere is the value of the back vertex power of a spherical-power spectacle lens or the vertex power in one of the two principal meridians of an astigmatic-power spectacle lens, depending on the principal meridian chosen for reference. 12.5 of this standard defines the cylindrical power or cylinder as plus or minus the astigmatic difference, depending on the principal meridian chosen for reference.

In a second alternative, the progressive power spectacle lens according to the disclosure can also be characterized as follows:

For the progressive power spectacle lens according to the disclosure with only one free-form surface, the refractive index of the progressive power spectacle lens can be determined at the point of the principal line of sight on the front surface or optionally on the back surface, at which the spectacle wearer experiences half of the power increase in the progressive power spectacle lens.

The principal line of sight is understood to mean the totality of all visual points through a spectacle lens surface during the gazing movement of the eye on object points straight in front of the spectacle wearer from distance to near. The principal line of sight regularly extends through the center of the intermediate corridor.

A distribution of the surface astigmatism with this constant refractive index for the free-form surface can then be calculated by means of the radii of curvature of the free-form surfaces with the aid of this refractive index of the principal line of sight on the free-form surface.

A surface astigmatism distribution of the free-form surface can be ascertained in the same way (calculated using the refractive index which was also used for the progressive power spectacle lens according to the disclosure) for a progressive power spectacle lens which is based on a substrate made of a material with a constant refractive index according to the related art, with the same relative position of the free-form surface and the same opposite surface, which was optimized for the same dioptric power and the same use conditions and which also has the same power distribution for the spectacle lens wearer.

As a result of the improved imaging properties in the intermediate corridor, the progressive power spectacle lens according to the disclosure will then have increased surface astigmatism values in a region around the principal line of sight in the intermediate region.

These will lie above the corresponding surface astigmatism values of the progressive power spectacle lens according to the related art by at least 0.25 dpt to addition power/3 dpt, particularly if the progressive power spectacle lens according to the related art has similar astigmatic deviations for the spectacle wearer along the principal line of sight in the intermediate portion.

Here, the comparison region can have a horizontal extent on both sides of the principal line of sight of up to 3 mm, 5 mm or even 10 mm and, vertically, at least comprise the region in which the addition power at the principal line of sight increases between 0.25*addition power and 0.75*addition power for the spectacle wearer.

Expressed differently, the subject matter of the disclosure consists in a product comprising:
  a) a progressive power spectacle lens and instructions for using the progressive power spectacle lens or
  b) a representation of the progressive power spectacle lens, situated on a data medium, in the form of computer-readable data and instructions for using the progressive power spectacle lens or
  c) a data medium with a virtual representation of the progressive power spectacle lens in the form of computer-readable data and instructions for using the progressive power spectacle lens or
  d) a representation of the progressive power spectacle lens in the form of a computer-readable data signal and instructions for using the progressive power spectacle lens, wherein
  the progressive power spectacle lens comprises a substrate with a front surface and a back surface, said substrate consisting of a material with a spatially varying refractive index, wherein the front surface has a front surface geometry and the back surface has a back surface geometry, wherein
  the front surface geometry and/or the back surface geometry are/is a free-form surface geometry,
  the progressive power spectacle lens has a distance design reference point and a near design reference point,
  the progressive power spectacle lens satisfies the following optical requirements:
    (1) a prescribed dioptric power at the distance design reference point lies within the admissible limit deviations pursuant to DIN EN ISO 8980-2:2004 and a prescribed dioptric power at the near design reference point lies within the admissible limit deviations pursuant to DIN EN ISO 8980-2:2004,
    (2) the dioptric power monotonically continuously increases between distance design reference point and near design reference point,
    (3) there is an intermediate corridor, which is defined by virtue of the residual astigmatism lying below a value from the group of:
      (a) 0.25 diopters
      (b) 0.38 diopters
      (c) 0.50 diopters.

In the case where the front surface of the progressive power spectacle lens has a free-form surface geometry, the free-form surface geometry of the front surface is modified in relation to a comparison progressive power spectacle lens with the same back surface geometry, with the same dioptric power profile and with the same residual astigmatism for the spectacle wearer beam paths through the principal line of sight on the basis of the instructions for using the progressive power spectacle lens and with a substrate made of a material with a spatially non-varying refractive index, which has a value that corresponds to the value of the spatially varying refractive index of the material of the substrate of the progressive power spectacle lens at the point of the principal line of sight on the front surface at which the progressive power spectacle lens with the substrate made of the material with a spatially varying refractive index experiences half of the entire dioptric power increase. The modified free-form surface geometry of the front surface of the progressive power spectacle lens and the spatial variation of the refractive index are adapted to one another in such a way that, for this progressive power spectacle lens, a first value of the surface astigmatism of the front surface, ascertained by calculation, at the point through which the associated spectacle wearer beam path extends through the location of the principal line of sight, at which this progressive power spectacle lens experiences half of the entire mean power increase, is greater than a second value of the surface astigmatism of the front surface with a free-form surface geometry, ascertained by calculation for the comparison progressive power spectacle lens from a material with a spatially non-varying refractive index, at the point at which the associated spectacle wearer beam path extends through the location on the principal line of sight at which this comparison progressive power spectacle lens experiences half of the entire mean power increase.

In the case where the back surface of the progressive power spectacle lens has a free-form surface geometry, the free-form surface geometry of the back surface is modified in relation to a comparison progressive power spectacle lens with the same front surface geometry, with the same dioptric power profile and with the same residual astigmatism for the beam paths through the principal line of sight on the basis of the instructions for using the progressive power spectacle lens and with a substrate made of a material with a spatially non-varying refractive index, which has a value that corresponds to the value of the spatially varying refractive index of the material of the substrate of the progressive power spectacle lens at the point of the principal line of sight on the back surface at which the progressive power spectacle lens with the substrate made of the material with a spatially varying refractive index experiences half of the entire dioptric power increase. Furthermore, the modified free-form surface geometry of the back surface of the progressive power spectacle lens and the spatial variation of the refractive index are adapted to one another in such a way that, for this progressive power spectacle lens, a first value of the surface astigmatism of the back surface, ascertained by calculation, at the point through which the associated spectacle wearer beam path extends through the location of the principal line of sight, at which this progressive power spectacle lens experiences half of the entire mean power increase, is greater than a second value of the surface astigmatism value of the back surface with a free-form surface geometry, ascertained by calculation for a the comparison progressive power spectacle lens with from a material with a spatially non-varying refractive index, at the point at which the associated spectacle wearer beam path extends through the location on the principal line of sight at which this comparison progressive power spectacle lens experiences half of the entire mean power increase.

Thus, the points on the principal line of sight specified above correspond to the location with the addition power.

The first surface astigmatism ascertained by calculation is calculated on the basis of a constant refractive index which has a value corresponding to the value of the refractive index of the substrate at the point of the principal line of sight on the front surface, at which the progressive power spectacle lens with the substrate made of the material with a spatially varying refractive index experiences half of the entire dioptric power increase.

The surface with the free-form surface geometry of the comparison progressive power spectacle lens has the same relative position as the progressive power spectacle lens according to the disclosure. In other words: If the free-form surface is the front surface in the progressive power spectacle lens according to the disclosure, this also applies to the comparison progressive power spectacle lens. If the free-form surface is the back surface in the progressive power spectacle lens according to the disclosure, this also applies to the comparison progressive power spectacle lens.

Moreover, the progressive power spectacle lens according to the disclosure and the comparison progressive power spectacle lens should also have a surface with a corresponding geometry lying opposite the free-form surface.

The dioptric power curve along the principal line of sight should also be the same in the progressive power spectacle lens according to the disclosure and the comparison progressive power spectacle lens.

The refractive index of the comparison progressive power spectacle lens should precisely correspond to the value that was used to calculate the surface astigmatism of the free-form surface of the progressive power spectacle lens according to the disclosure. Accordingly, the refractive index should have a value that corresponds to the value of the refractive index of the substrate at the point of the principal line of sight on the front surface (if the front surface is a free-form surface) or on the back surface (if the back surface is a free-form surface) at which the progressive power spectacle lens according to the disclosure with the substrate made of the material with a spatially varying refractive index is half of the entire dioptric power increase.

The object specified above is achieved in full by these two alternatives.

An optimization of the lens according to the disclosure can proceed, for example, from a design of an existing optimized progressive power spectacle lens according to the related art with a constant refractive index for the specific prescription, the specific use conditions (pantoscopic angle, face form angle, vertex distance, centration, . . . ) and the specific thicknesses of this lens.

The term design here denotes the distribution of the residual spherical and astigmatic aberrations for the spectacle wearer over the entire lens. For this progressive power spectacle lens, it is possible to define a principal line of sight in accordance with the definition specified in the introductory part of the description, for which small residual astigmatic aberrations can be obtained, particularly in the intermediate portion. The intermediate portion is the entire transition region between the distance portion (region for distance vision; see section 14.1.1 of DIN EN ISO 13666: 2013-10, section) and near portion (region for near vision; see section 14.1.3 of DIN EN ISO 13666:2013-10). DIN EN ISO 13666:2013-10 defines the intermediate portion in section 14.1.2 as that portion of a trifocal lens having the dioptric power for vision at ranges intermediate between distance and near. This definition is extended in the present case.

However, owing to Minkwitz's law, the residual astigmatic aberrations will increase in the horizontal direction alongside the principal line of sight (owing to the dioptric power increase in the vertical direction).

The aim of the disclosure is to reduce these residual spherical and astigmatic aberrations, in particular the residual astigmatic aberrations, alongside the principal line of sight (i.e. in the central region of the intermediate portion).

Proceeding from this design, it is possible to produce a new target design which contains the previous distribution of spherical and astigmatic aberrations, although these are reduced in the central intermediate portion in particular. In this case, the residual astigmatic aberrations are typically reduced in a region around the principal line of sight (e.g., the region at a distance of 5, 10 to 20 mm from the principal line of sight), e.g., by them being multiplied by a factor of 0.5 to 0.8, in order to attain an improved target design.

The target design can, e.g., also be fixed by the stipulation of residual optical, in particular spherical and astigmatic, aberrations at many points distributed over the front surface of the entire lens. In this case, there may be specifications for the distances of the objects for which the powers and/or residual spherical and astigmatic aberrations for the spectacle wearer when looking through the lens are determined. Furthermore, there may be stipulations for the surface curvatures at further points on the progressive surface, thickness requirements (in particular in the geometric center and at the edge of the progressive power spectacle lens) and prismatic requirements at further points.

An individual weighting $w_{ij}$ can be assigned to each of these optical and geometric stipulations $v_{ij}$ at each of the aforementioned points $P_i$. If the residual aberrations, surface curvatures, prism powers and thicknesses $r_{ij}$ for the stipulation ij at the point $P_i$ are determined for a starting lens (e.g., the progressive power spectacle lens optimized for the constant refractive index), it is thus possible to determine a total aberration G:

$$G=\Sigma_i\Sigma_j(w_{ij}*(r_{ij}-v_{ij}))^2.$$

This function value G dependent on the optical and geometric lens properties can be minimized by means of known mathematical methods by simultaneously changing the surface geometry and the refractive index distribution. A progressive power spectacle lens having improved properties in regard to the requirements specified above is obtained in this way.

Alternatively, for the optimization of the progressive power spectacle lens with a material with the variable refractive index, it is also possible to use the original target design, that is to say, the target design that was used for the optimization of the lens with a constant refractive index. In this case, the weightings used in the optimization with the original design can be used or else altered. In particular, the weighting for the residual astigmatic and spherical aberrations in the intermediate corridor can be increased or the target stipulation for the residual astigmatic and spherical aberrations can be reduced to obtain improved properties of the progressive power spectacle lens in the progression region. However, increasing the weighting in the intermediate corridor is expedient here only if the astigmatic and spherical aberrations of the optimized lens with a material with a constant refractive index do not already correspond to the stipulations of the (new) target design.

If the original design had already been accepted by the spectacle wearer, this procedure yields at any rate a more compatible design for the spectacle wearer since the residual optical aberrations are reduced with the new design. What is achieved overall is a new improved target design which is not obtainable with a material with a constant refractive index, but with this target design and by means of simultaneous optimization of the form of the free-form surfaces and the distribution of the refractive index for a material with a non-constant refractive index, it is possible to achieve an improved progressive power spectacle lens design having, in particular, a wider intermediate corridor, lower maximum residual astigmatic aberrations in the intermediate region and thus also less distortion in the intermediate region.

The computer-implemented method according to the disclosure for designing a progressive power spectacle lens according to the disclosure, which comprises a substrate with a front surface and a back surface, said substrate consisting of a material with a spatially varying refractive index, the front surface and/or the back surface of which have/has a free-form surface geometry which has a distance design reference point and a near design reference point and which meets the following optical requirements:

(1) a prescribed dioptric power at the distance design reference point within the admissible limit deviations pursuant to DIN EN ISO 8980-2:2004 and a prescribed dioptric power at the near design reference point within the admissible limit deviations pursuant to DIN EN ISO 8980-2:2004, (2) a monotonically increasing gradient of the prescribed dioptric power between distance design reference point and near design reference point on a principal line of sight, (3) an intermediate corridor, which is defined by virtue of the residual astigmatism lying below a value from the group of
 (a) 0.25 diopters
 (b) 0.38 diopters
 (c) 0.50 diopters,
wherein:
 (i) the free-form surface geometry of the front surface and/or the back surface of the progressive power spectacle lens and the spatial variation of the refractive index are adapted to one another in such a way that a comparison progressive power spectacle lens with the same geometry but based on a substrate made of a material with a spatially non-varying refractive index does not satisfy at least one of the optical requirements (1) to (3) or wherein (ii) the free-form surface geometry of the front surface and/or the back surface of the progressive power spectacle lens and the spatial variation of the refractive index are adapted to one another in such a way that, for this progressive power spectacle lens, a first value of the surface astigmatism of the surface with the free-form surface geometry, ascertained by calculation, at the point through which the associated spectacle wearer beam path extends through the location of the principal line of sight, at which this progressive power spectacle lens experiences half of the entire mean power increase, is greater than a second value of the surface astigmatism of the surface with the free-form surface geometry, ascertained by calculation for a comparison progressive power spectacle lens from a material with a spatially non-varying refractive index, at the point at which the associated spectacle wearer beam path extends through the location on the principal line of sight at which this comparison progressive power spectacle lens experiences half of the entire mean power increase, and wherein the comparison progressive power spectacle lens has the same relative position of the surface with the free-form surface geometry and the same geometry of the opposite surface, the same dioptric power profile along the principal line of sight and the refractive index has a value which corresponds to the value of the refractive index of the substrate at the point of the principal line of sight on the front surface, at which the progressive power spectacle lens with the substrate made of the material with a spatially varying refractive index experiences half of the entire dioptric power increase.

The object specified above is achieved in full by these two alternatives.

The disclosure also relates to a method for producing, by way of an additive method, a progressive power spectacle lens according to any one of the products described above or a progressive power spectacle lens designed using a method of the above-described type.

Additive methods are methods in which the progressive power spectacle lens is constructed sequentially. Particularly in this context, it is known that so-called digital fabricators, in particular, offer manufacturing options for virtually any structures, said structures not being realizable or only being realizable with difficulty using conventional abrasive methods. Within the digital fabricator machine class, 3D printers represent the most important subclass of additive, i.e., accumulating, building fabricators. The most important techniques of 3D printing are selective laser melting (SLM) and electron-beam melting for metals and selective laser sintering (SLS) for polymers, ceramics and metals, stereolithography (SLA) and digital light processing for liquid artificial resins and multijet or polyjet modeling (e.g., inkjet printers) and fused deposition modeling (FDM) for plastics and, in part, artificial resins. Further, construction with the aid of nanolayers is also known, as described, for example, at peaknano.com/wp-content/uploads/PEAK-1510-GR-INOptics-Overview.pdf, retrieved on Jan. 12, 2017.

Source materials for manufacturing by means of 3D printing and options for the 3D manufacturing method itself can be gathered from, for example, the European patent application number EP3312661.

A development of the disclosure consists in a method for producing a progressive power spectacle lens comprising a method for designing a progressive power spectacle lens as described above and manufacturing the progressive power spectacle lens according to the design.

Manufacturing the progressive power spectacle lens according to the design can, according to the disclosure, be implemented by an additive method.

Another development of the disclosure consists in a computer comprising a processor configured to carry out a method for designing a progressive power spectacle lens according to the above-described type.

BRIEF DESCRIPTION OF THE DRAWINGS

The disclosure will now be described with reference to the drawings wherein.

DESCRIPTION OF EXEMPLARY EMBODIMENTS

In the exemplary embodiment described below, the following requirements are assumed:
Spherical power: Sph=0.00 dpt
Cylindrical power: Cyl=0.00 dpt
Addition power: Add=2.50 dpt
Progression length: L=14 mm
Pantoscopic angle: 9 degrees
Face form angle: 5 degrees
Distance from the eye's center of rotation: 25.5 mm
Object distance near: 380 mm
Front surface spherical with radius R=109.49 mm
Back surface free-form surface
Mean thickness 2.55 mm.

FIG. 2 shows optical properties of a progressive power spectacle lens with a substrate made of a material with a constant refractive index of n=1.60 according to the related art. The mean power can be gathered from FIG. 2A). When gazing horizontally straight ahead (i.e., for a visual point through the lens of 4 mm above the geometric center), the spectacle wearer obtains a mean power of 0 dpt and, in the case of a gaze through the point 11 mm below the geometric center and −2.5 mm horizontally in the nasal direction, said spectacle wearer obtains a mean power of 2.50 dpt. That is to say, the lens power accordingly increases by approximately 2.50 dpt over a length of 15 mm.

Figure 1:
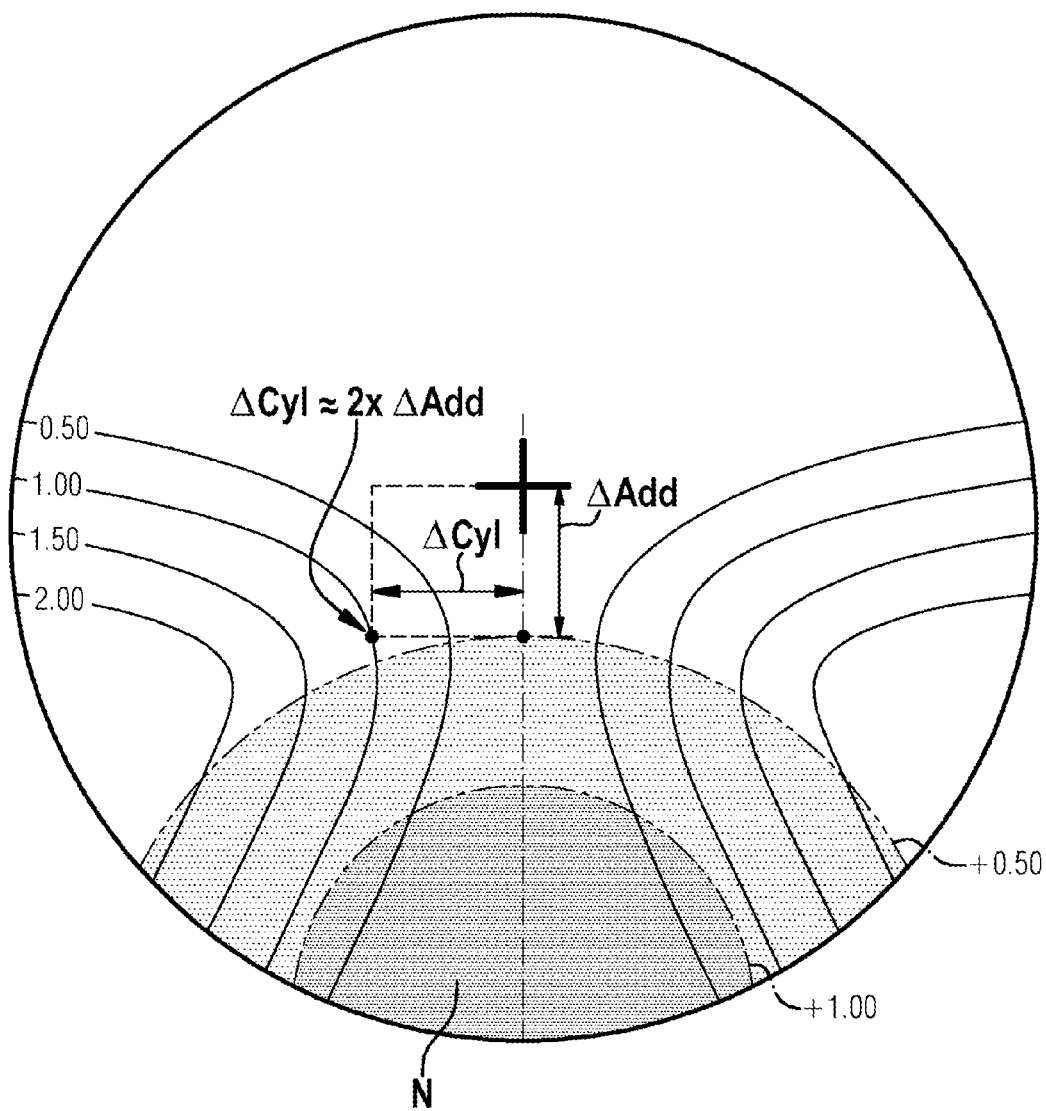
FIG. 1 shows a diagram with an iso residual astigmatism distribution of a progressive power spectacle lens with a substrate made of a material with a constant refractive index, for the purposes of demonstrating Minkwitz's theorem (related art)
Figure 2A:
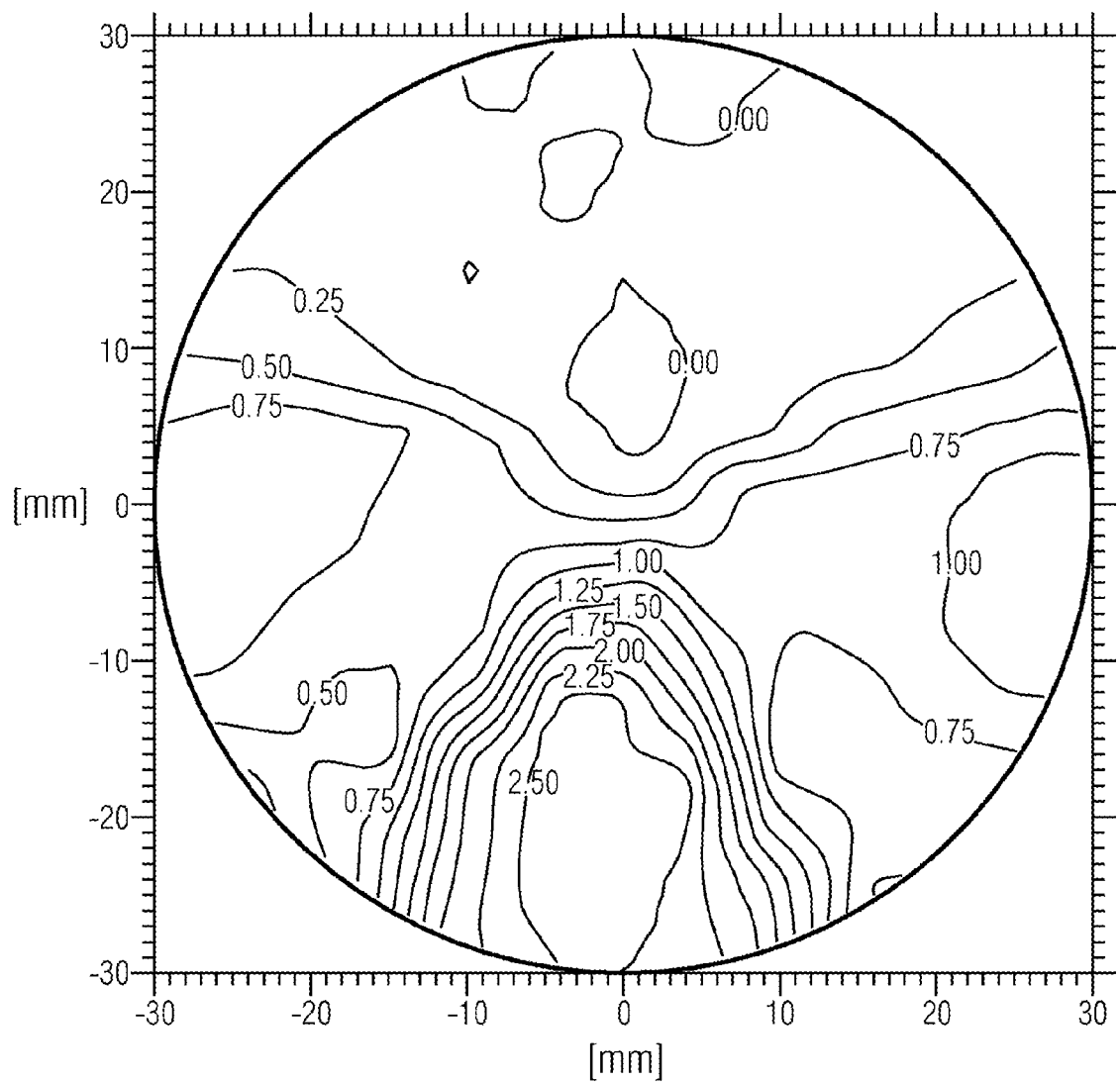
FIG. 2A shows the mean power of a progressive power spectacle lens with a substrate made of a material with a constant refractive index of n=1.60 (related art)
Figure 2B:
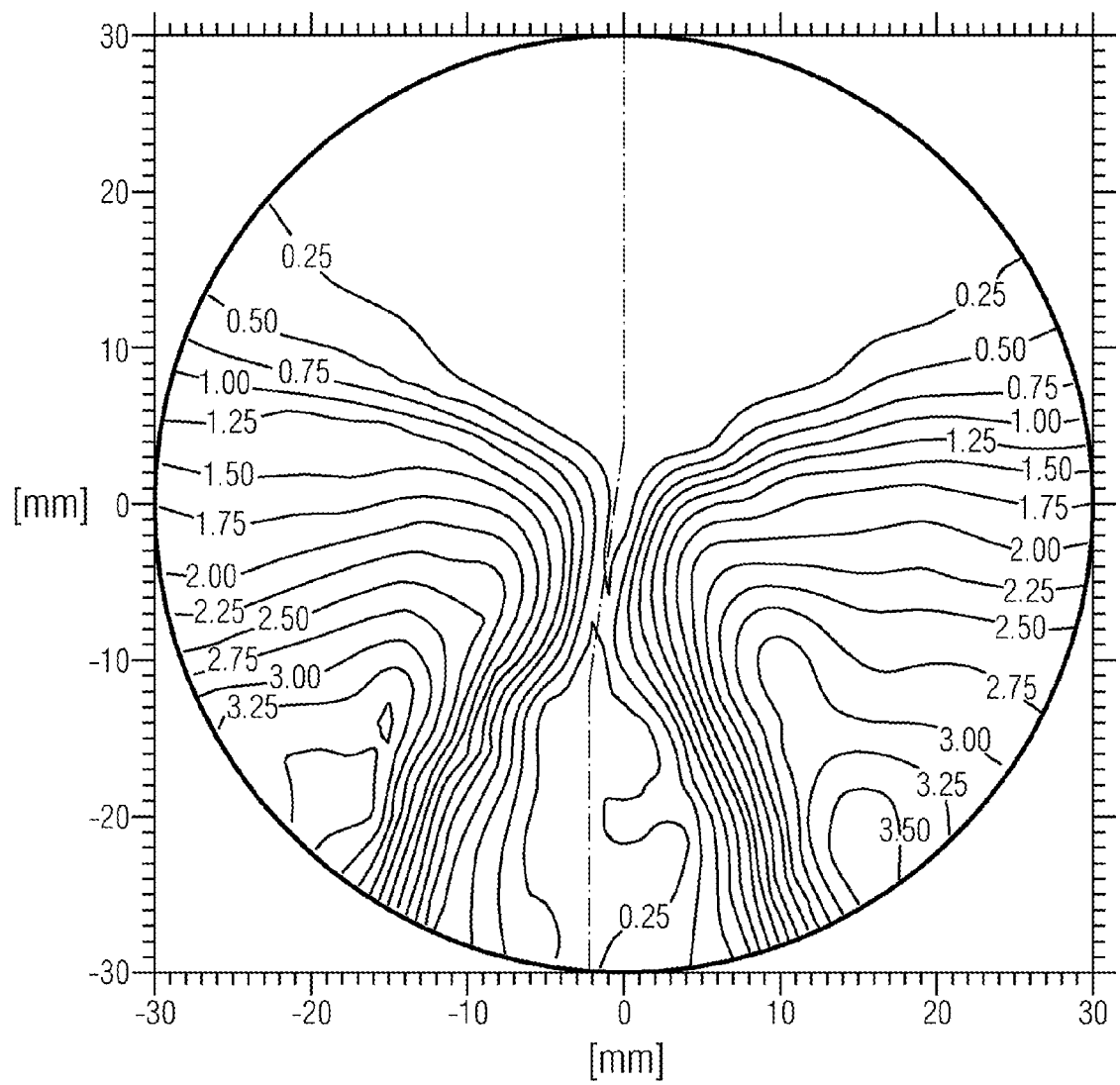
FIG. 2B shows the residual astigmatism of the spectacle lens of FIG. 2A.

The residual astigmatism profile of the progressive power spectacle lens according to the related art, shown in FIG. 2B, exhibits the increase of the residual astigmatism in the direction perpendicular to the principle line of sight that is to be expected according to Minkwitz's theorem. In the example shown, the following values emerge for the width of the region with the residual astigmatism <1 dpt (intermediate corridor):
For 0.25*addition power: 6.1 mm
For 0.50*addition power: 4.6 mm
For 0.75*addition power: 5.0 mm.

In FIG. 2B, this corresponds to the y-values of −0.5 mm, −4 mm, −7.5 mm. The principal line of sight is marked in the drawing.

Figure 2C:
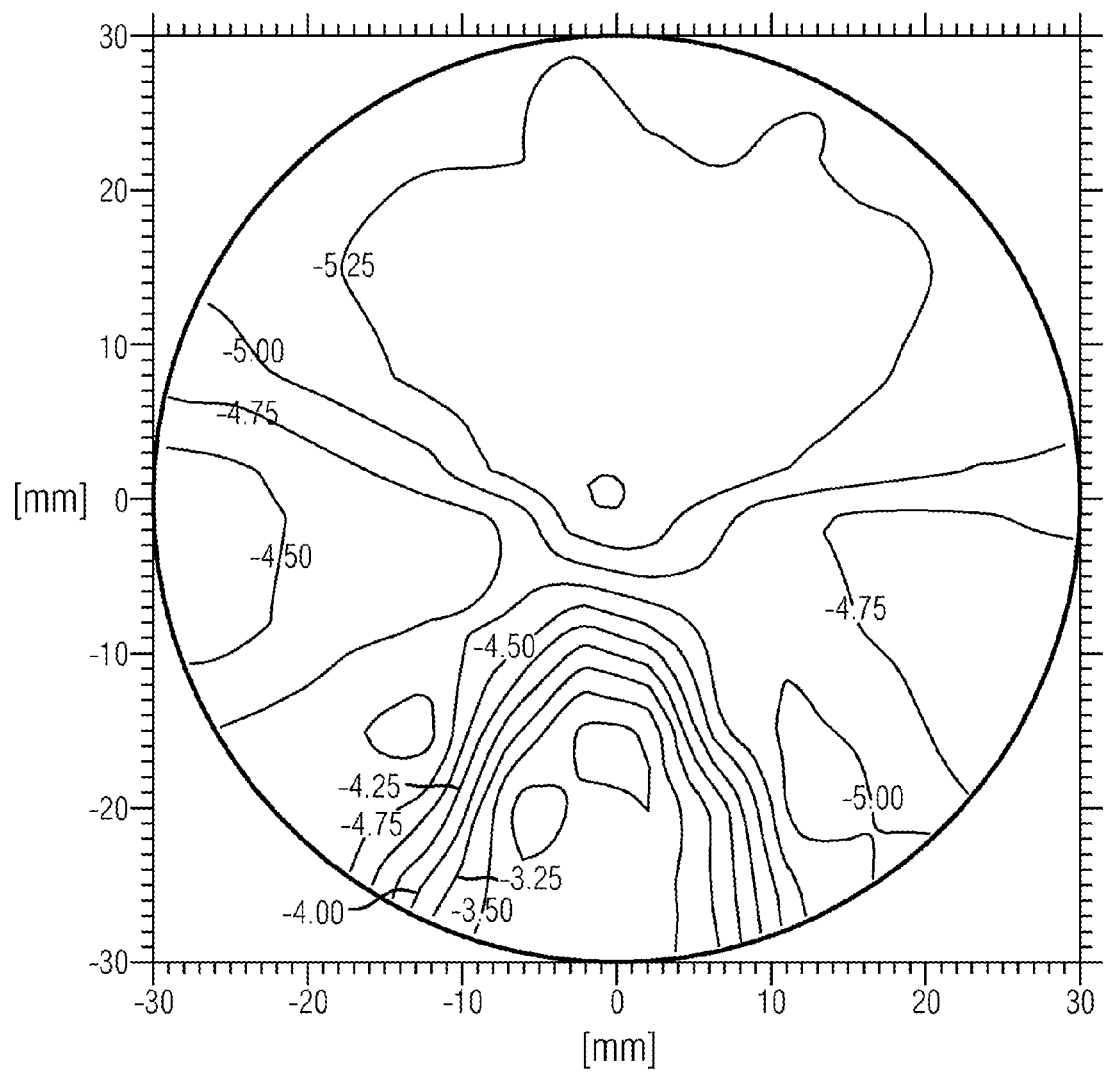
FIG. 2C shows the mean surface refractive power of the spectacle lens of FIG. 2A.

FIG. 2C shows the distribution of the mean surface refractive power of the back surface embodied as a free-form surface. The surface curvature decreases continuously from top to bottom; the mean surface power value increases from −5.50 dpt at y=approximately 2 mm to −3.50 dpt at y=−15 mm.

Figure 2D:
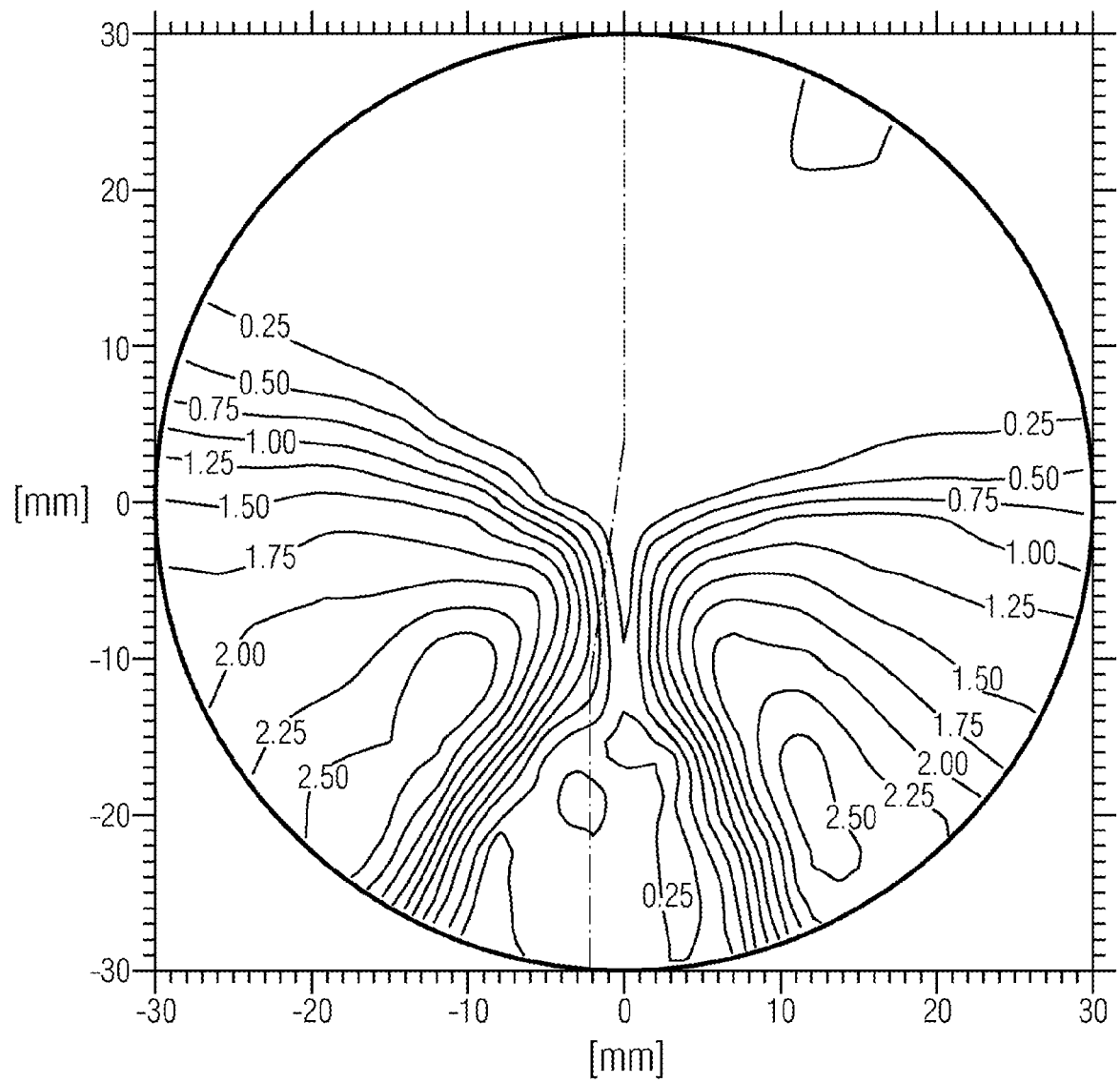
FIG. 2D shows the surface astigmatism of the spectacle lens of FIG. 2A.

The distribution of the surface astigmatism of the back surface of the progressive power spectacle lens according to the related art, which can be gathered from FIG. 2D, corresponds exactly to the residual astigmatism of the spectacle lens in this case: vanishing astigmatism in the distance portion and in the intermediate corridor; rapid increase in the astigmatism to the side of the intermediate corridor.

Now, a progressive power spectacle lens according to the disclosure is distinguished by the optical properties described below and illustrated in FIGS. 3A to 3F.

Figure 3A:
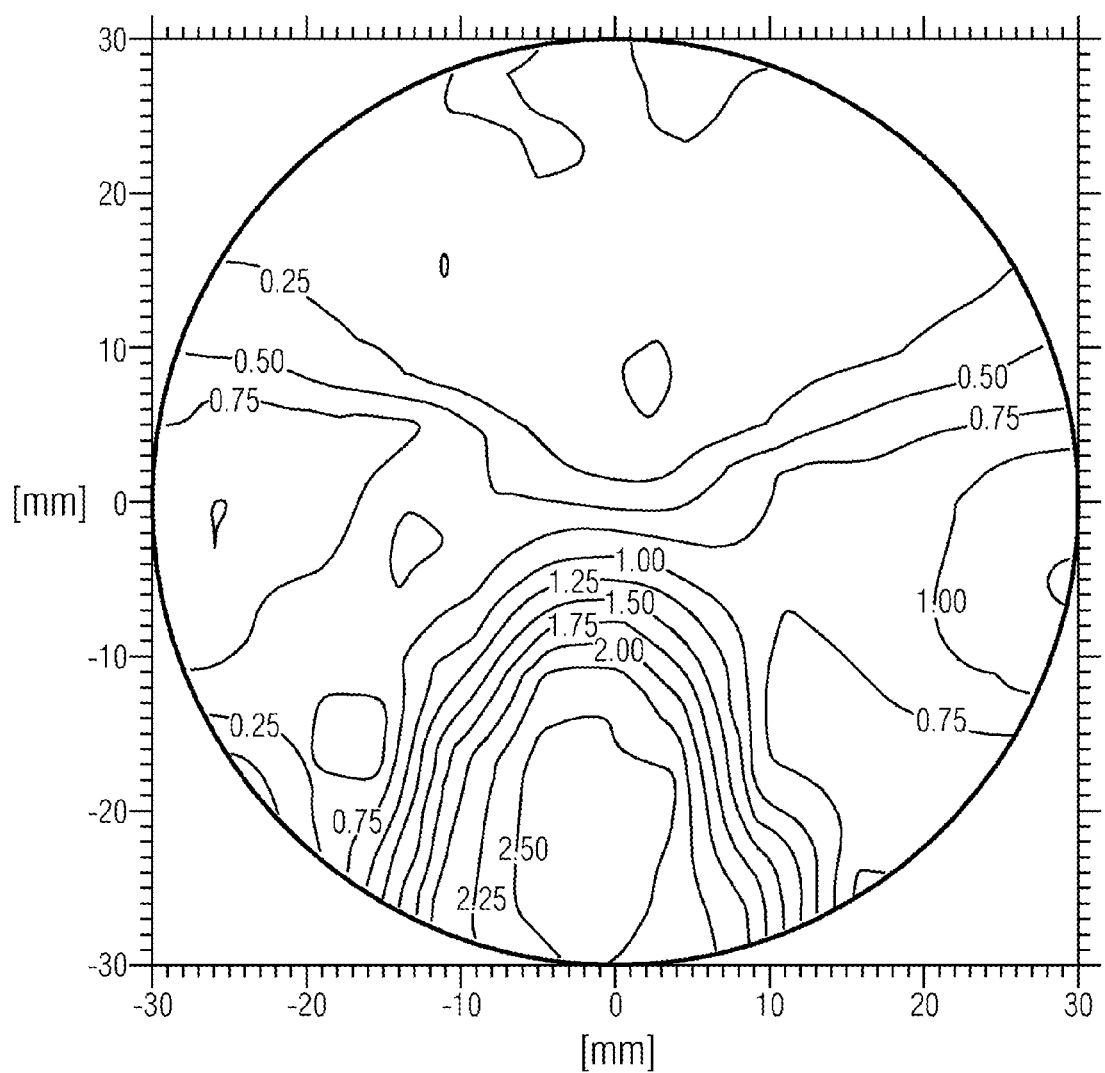
FIG. 3A shows the mean power of a progressive power spectacle lens according to the disclosure with a substrate made of a material with a varying refractive index.

The distribution of the mean power, which corresponds to the distribution of the mean power of the progressive power spectacle lens according to the related art, illustrated in FIG. 2A, can be gathered from FIG. 3A. In particular, from FIGS. 2A and 3A, it is possible to gather that the power increase along the principal line of sight in the intermediate corridor is the same.

Figure 3B:
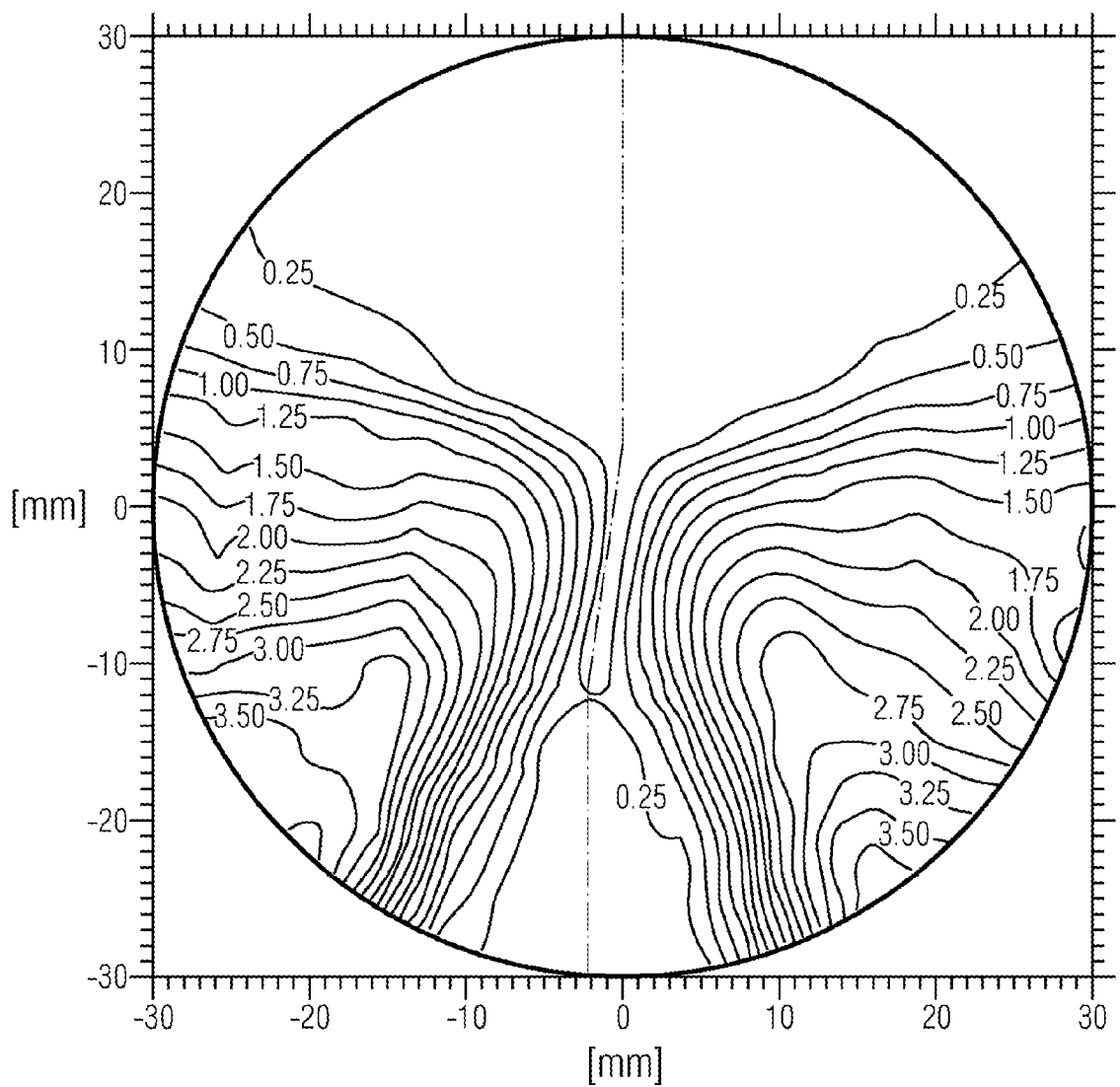
FIG. 3B shows the residual astigmatism of the spectacle lens of FIG. 3A.

The residual astigmatism profile, shown in FIG. 3B, exhibits an increase of the residual astigmatism in the direction perpendicular to the principal line of sight which is significantly lower in the GRIN progressive power spectacle lens according to the disclosure than in the related art. In the example shown, the following values emerge for the width of the region with the residual astigmatism <1 dpt (intermediate corridor):
For 0.25*addition power: 7.3 mm
For 0.50*addition power: 6.0 mm
For 0.75*addition power: 6.5 mm In FIG. 3B, this corresponds to the y-values of −0.5 mm, −4 mm, −7.5 mm.

Thus, the corridor broadening in relation to the lens with a constant refractive index is at least 1.2 mm everywhere, corresponding to a broadening of at least 20%.

Figure 3C:
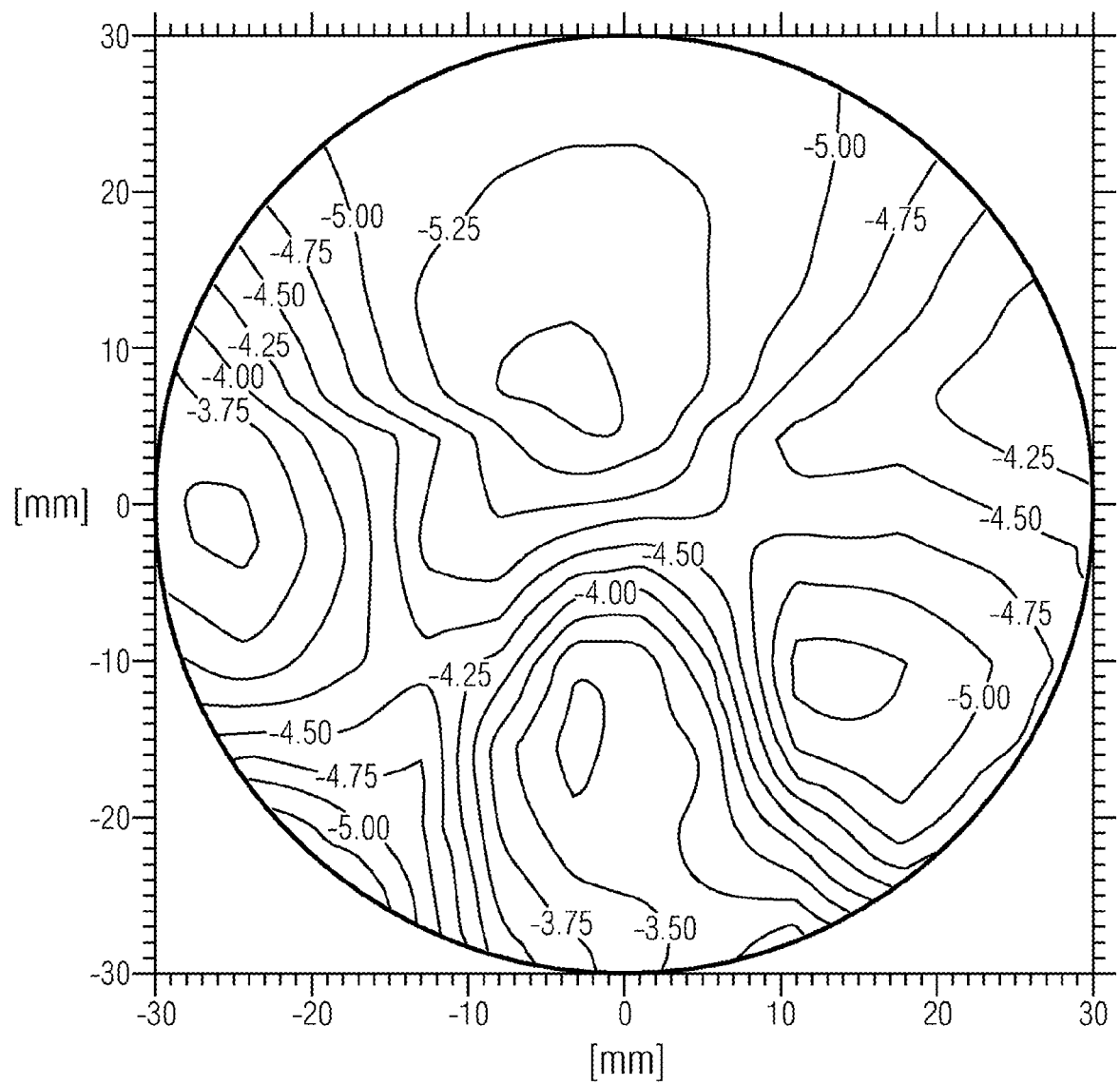
FIG. 3C shows the mean surface refractive power of the spectacle lens of FIG. 3A.
Figure 3D:
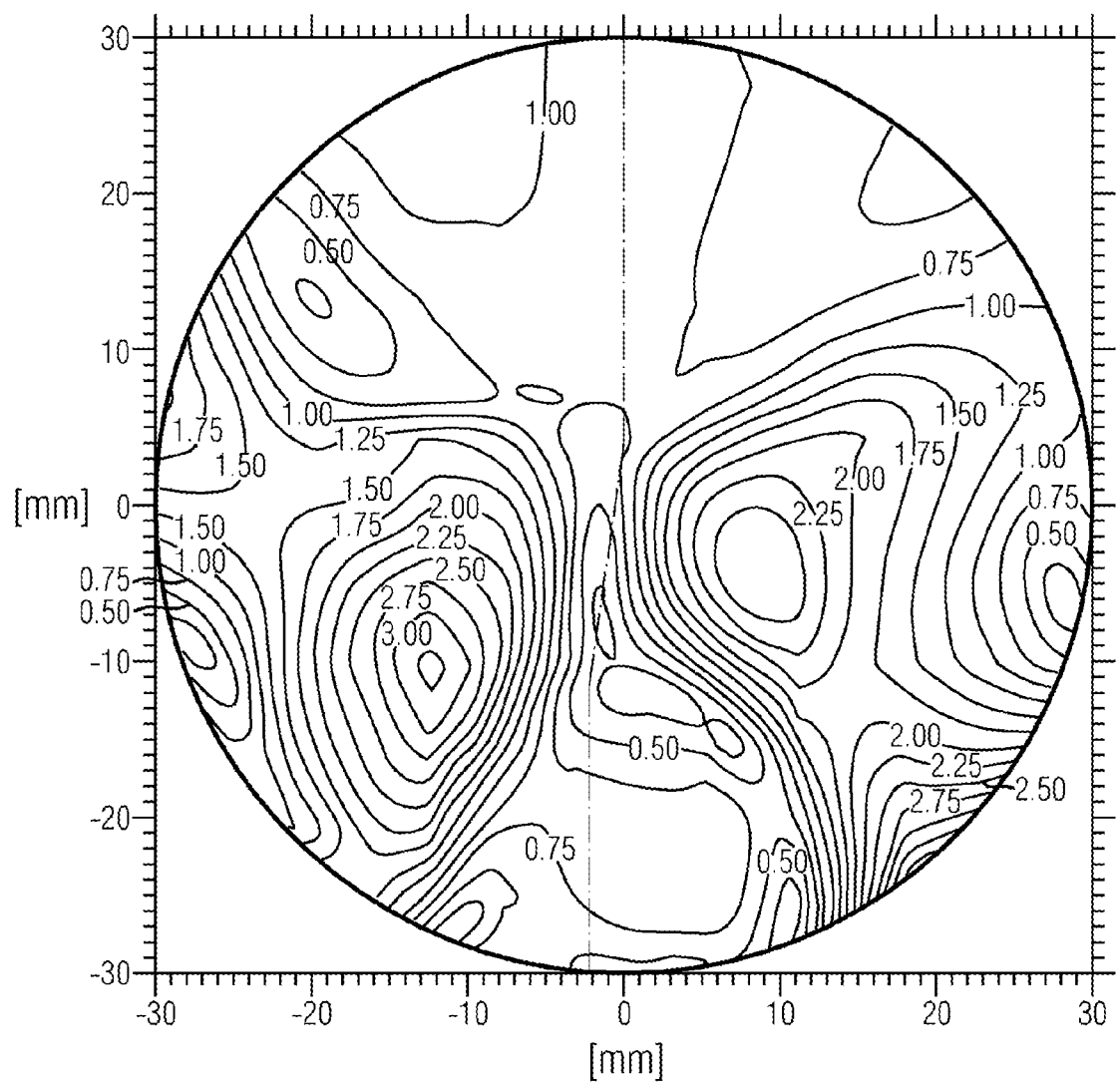
FIG. 3D shows the surface astigmatism, related to a refractive index of n=1.60, of the spectacle lens of FIG. 3A.

FIG. 3C shows the mean surface refractive power of the back-side free-form surface related to a refractive index of n=1.60 and FIG. 3D shows the surface astigmatism of the back-side free-form surface related to a refractive index of n=1.60. In order to allow a comparison with FIG. 2C in respect of the mean curvatures and with FIG. 2D in respect of the surface astigmatism, it was not the GRIN material that was used during the calculation but a material with the refractive index of n=1.600.

The comparison of FIGS. 2C and 2D with FIGS. 3C and 3D shows that the form of the free-form surface has changed significantly: both the distribution of the mean surface refractive power and the distribution of the surface astigmatism (calculated with n=1.600) no longer reveal a typical intermediate corridor. In the case of the GRIN progressive power spectacle lens according to the disclosure, it is not possible to determine that this is a progressive power lens from the surface shape alone: the astigmatism disappears neither from the distance portion nor from the intermediate corridor.

Figure 3E:
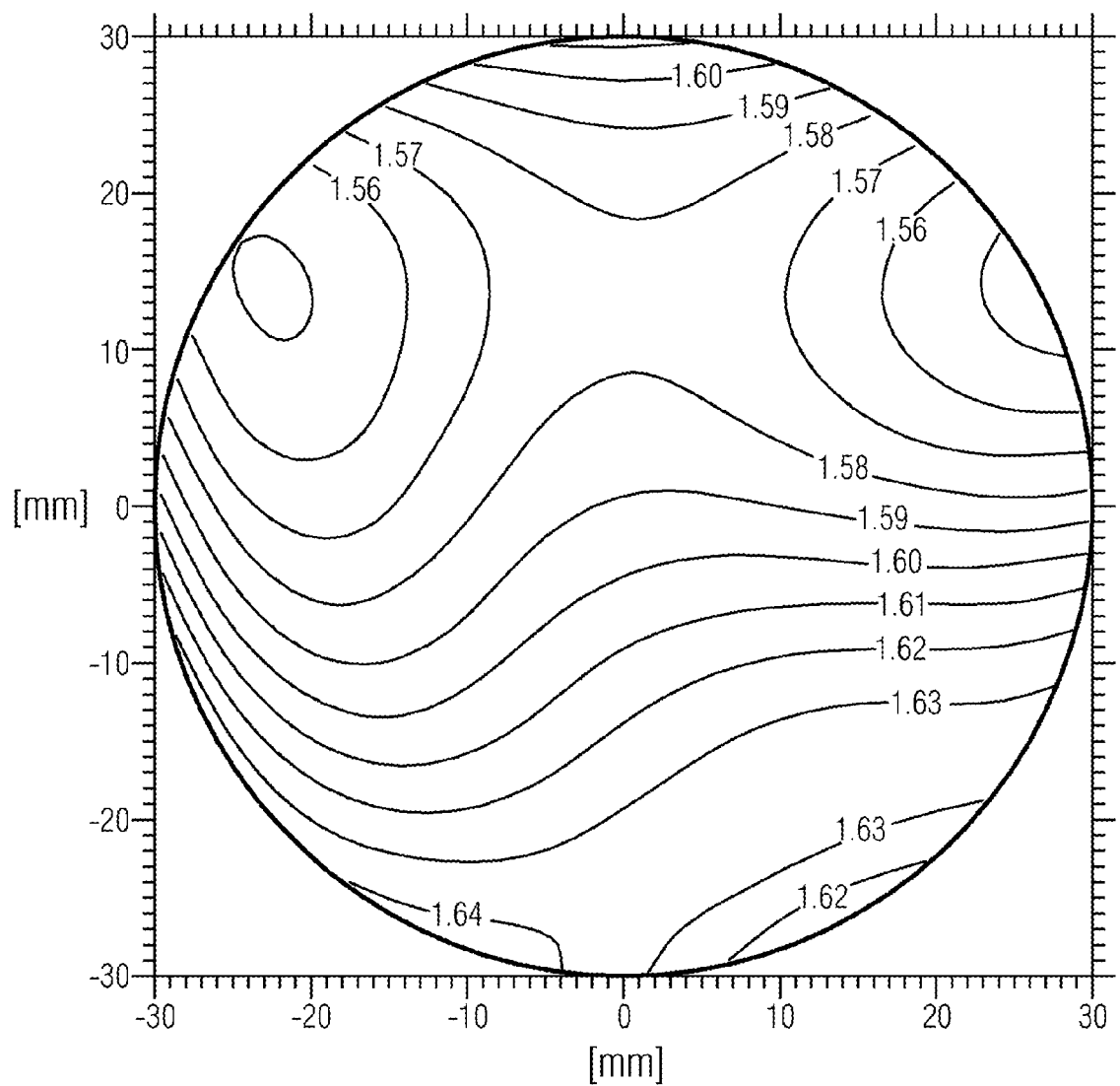
FIG. 3E shows the refractive index distribution of the spectacle lens of FIG. 3A.
Figure 3F:
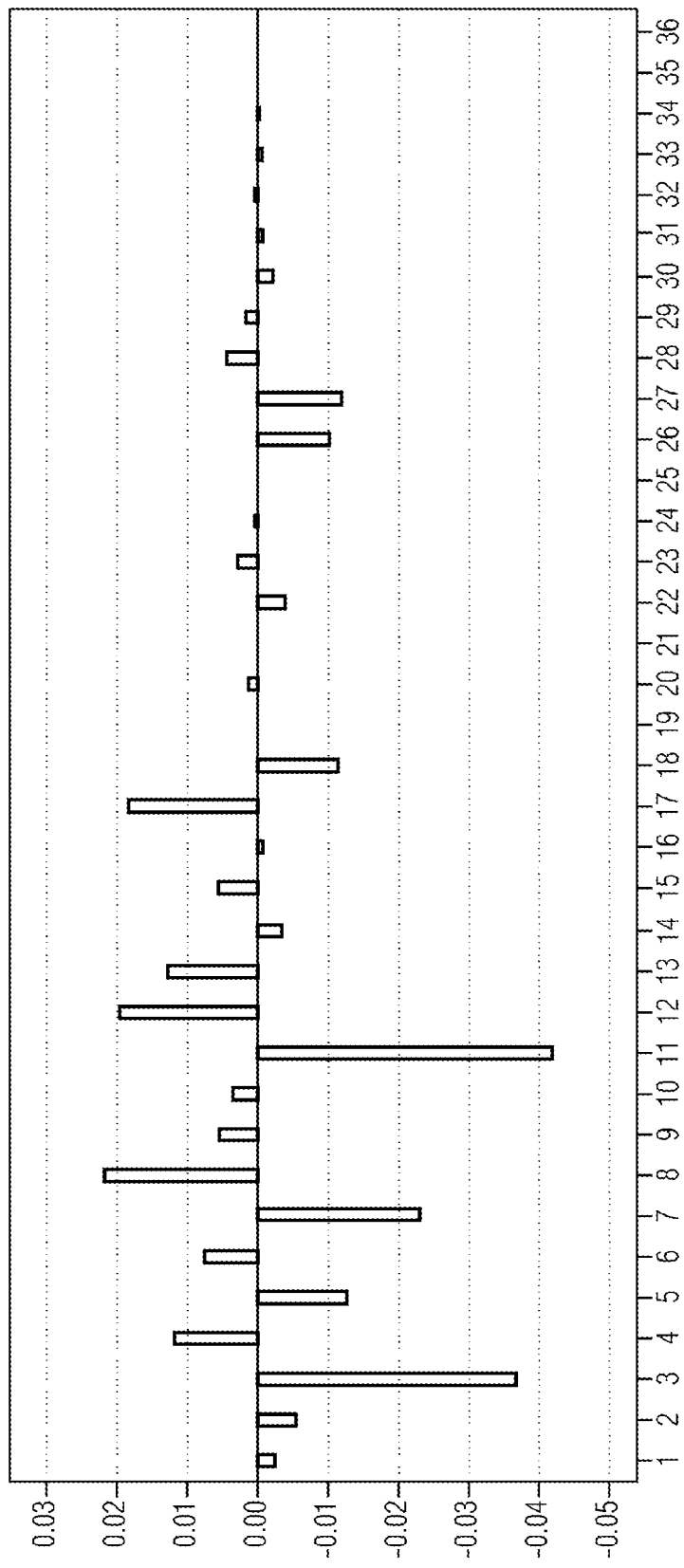
FIG. 3F shows the Fringe-Zernike coefficients of the refractive index distribution of the spectacle lens of FIG. 3A.

The refractive index distribution of the progressive power spectacle lens according to the disclosure is shown in FIG. 3E. It is distinguished in having neither point symmetry nor axial symmetry. The minimum refractive index of 1.55 occurs in the top lateral region, the maximum refractive index of 1.64 in the lower region. The refractive index distribution is invariant in the direction perpendicular to the plane illustrated; thus, it only changes in two spatial dimensions.

The equation $$n = 1.60 + \sum_{n=1}^{36} c_n Z_n(x,y)$$

represents a Fringe-Zernike series expansion of the refractive index distribution of the progressive power spectacle lens according to the disclosure. $Z_n(x,y)$ denotes the Fringe-Zernike polynomials in Cartesian coordinates. The Fringe-Zernike coefficients of the refractive index distribution of the progressive power spectacle lens according to the disclosure according to the example are gathered from FIG. 3F.

Figure 4A:
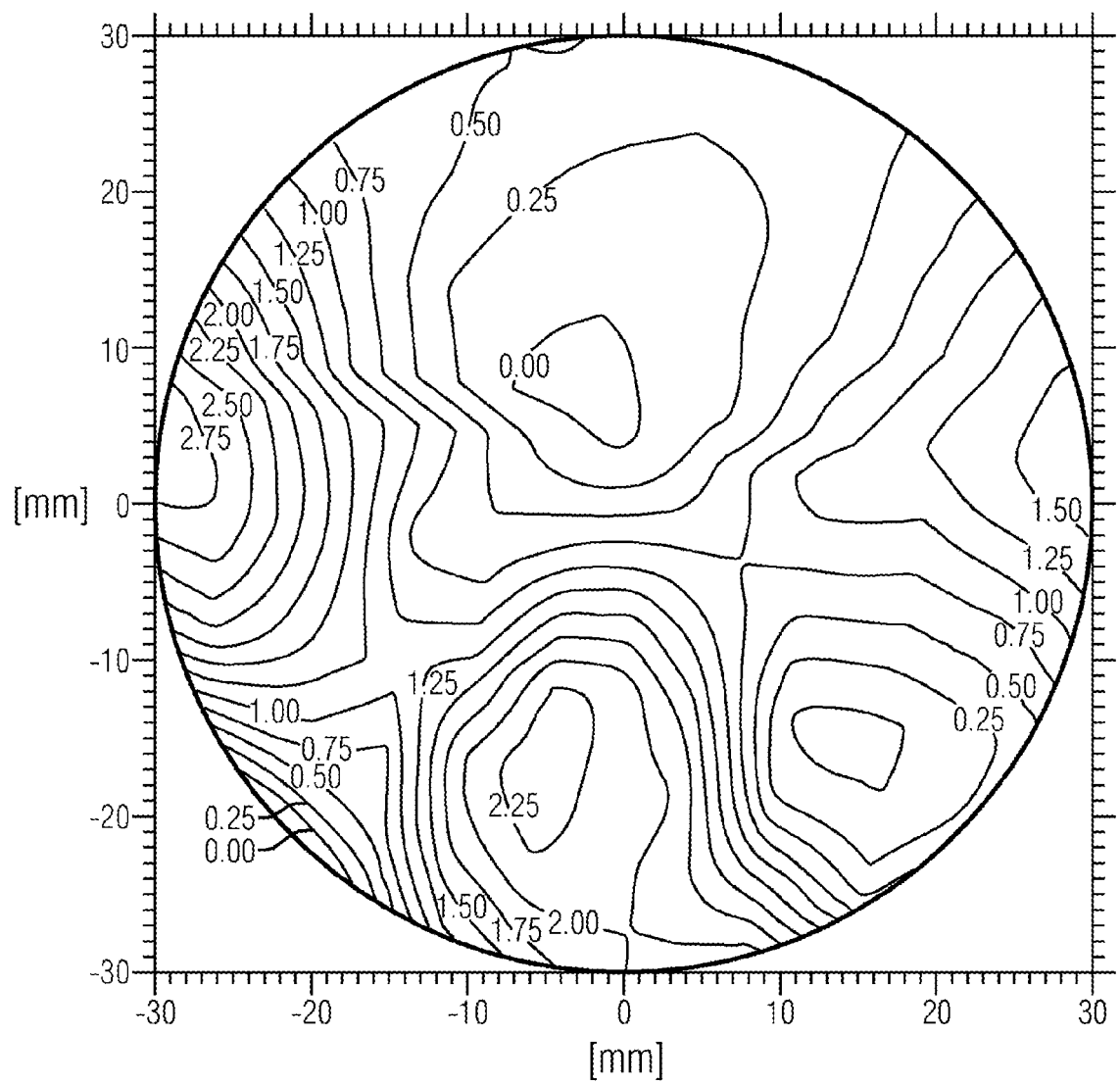
FIG. 4A shows the mean power of a comparison progressive power spectacle lens with the same geometry as the progressive power spectacle lens according to the disclosure as per FIG. 3, calculated on the basis of a substrate made of a material with a constant refractive index of n=1.60.
Figure 4B:
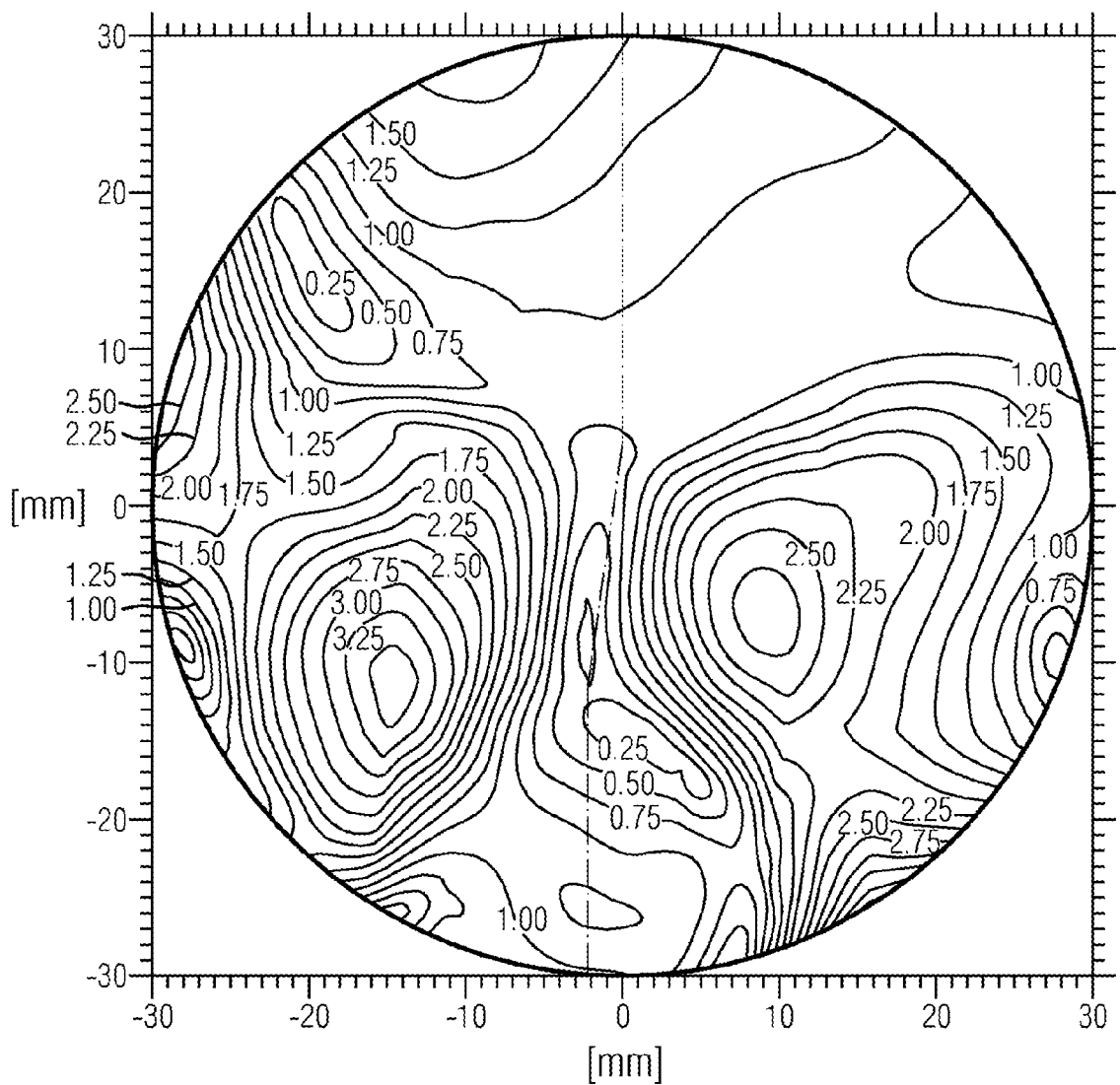
FIG. 4B shows the residual astigmatism of the spectacle lens of FIG. 4A.

For comparison purposes, FIGS. 4A and 4B show optical properties of a comparison progressive power spectacle lens with the same geometry as the progressive power spectacle lens according to the disclosure as per FIGS. 3A and 3B, calculated on the basis of a substrate made of a material with a constant refractive index of n=1.60.

The distributions of mean power and residual astigmatism, shown in FIGS. 4A and 4B, do not have the properties required for a usable progressive power spectacle lens, in particular not for the use conditions described here and the required optical correction for the spectacle wearer. As can be gathered from FIG. 4B, a residual astigmatism of at least 0.75 dpt is already present in the distance portion. Hence, this progressive power spectacle lens is not useful for the emmetropic spectacle wearer considered here. As can be gathered from FIG. 4A, the required near portion power of 2.5 dpt is not achieved anywhere. Moreover, the residual astigmatism is more than 1 dpt in a large region of the near portion, as shown in FIG. 4B.

The subject matter of the disclosure is sketched out below in the form of clauses within the meaning of the decision J15/88 of the Boards of Appeal of the European Patent Office:

Clause 1: A product comprising (i) a progressive power spectacle lens or (ii) a representation of the progressive power spectacle lens situated on a data medium, or (iii) a data medium with a virtual representation of the progressive power spectacle lens, wherein the progressive power spectacle lens comprises a substrate with a front surface and a back surface, said substrate consisting of a material with a spatially varying refractive index, the front surface and/or the back surface have/has a free-form surface geometry, the progressive power spectacle lens has a distance design reference point and a near design reference point, the progressive power spectacle lens satisfies the following optical requirements:

a prescribed dioptric power at the distance design reference point within the admissible limit deviations pursuant to DIN EN ISO 8980-2:2004 and a prescribed dioptric power at the near design reference point within the admissible limit deviations pursuant to DIN EN ISO 8980-2:2004, a monotonically increasing gradient of the dioptric power between distance design reference point and near design reference point on a principal line of sight, an intermediate corridor which surrounds the distance design reference point and the near design reference point and which is defined by virtue of the residual astigmatism lying below a value from the group of a) 0.25 diopters
b) 0.38 diopters
c) 0.50 diopters, wherein (i) the free-form surface geometry of the front surface and/or the back surface of the progressive power spectacle lens and the spatial variation of the refractive index are adapted to one another in such a way that a comparison progressive power spectacle lens with the same geometry but based on a substrate made of a material with a spatially non-varying refractive index does not satisfy at least one of the optical requirements (1) to (3) or wherein (ii) the free-form surface geometry of the front surface and/or the back surface of the progressive power spectacle lens and the spatial variation of the refractive index are adapted to one another in such a way that, for this lens, a first surface astigmatism value of the surface with the free-form surface geometry, ascertained by calculation, at the point through which the associated spectacle wearer beam extends through the location of the principal line of sight, at which this lens experiences half of the entire mean power increase, is greater than a second surface astigmatism value of the surface with a free-form surface geometry, ascertained by calculation for a comparison progressive power spectacle lens with a material with a spatially non-varying refractive index, at the point at which the associated spectacle wearer beam extends through the location on the principal line of sight at which this comparison progressive power spectacle lens experiences half of the entire mean power increase, and wherein the comparison progressive power spectacle lens has the same relative position of the surface with free-form surface geometry and the same geometry of the opposite surface, the same dioptric power profile along the principal line of sight and the refractive index has a value which corresponds to the value of the refractive index of the substrate at the point of the principal line of sight on the front surface, at which the progressive power spectacle lens with the substrate made of the material with a spatially varying refractive index experiences half of the entire dioptric power increase.

Clause 2: The product according to clause 1, characterized in that, in case (ii), the value of the first surface astigmatism ascertained by calculation
is at least 0.25 diopters greater than the value of the second surface astigmatism ascertained by calculation or
is greater than the value of the second surface astigmatism ascertained by calculation by at least one third of the value of the near addition power.

Clause 3: The product according to clause 1 or 2, wherein, in case (ii), the value of the first surface astigmatism ascertained by calculation is greater than the value of the second surface astigmatism ascertained by calculation not only at one point but in a region along the principal line of sight, in which the progressive power spectacle lens and the comparison progressive power spectacle lens experience one quarter to three quarters of the entire dioptric power increase.

The foregoing description of the exemplary embodiments of the invention illustrates and describes the present disclosure. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A product comprising:
a progressive power spectacle lens having a substrate with a front surface and a back surface, the substrate including a material with a spatially varying refractive index,
wherein the front surface has a front surface geometry and the back surface has a back surface geometry,
wherein at least one of the front surface geometry or the back surface geometry is a free-form surface geometry,
wherein the progressive power spectacle lens has a distance design reference point and a near design reference point,
wherein the progressive power spectacle lens is configured to satisfy the following optical requirements:
(1) a prescribed dioptric power at the distance design reference point within an admissible limit deviation pursuant to DIN EN ISO 8980-2:2004 and a prescribed dioptric power at the near design reference point within an admissible limit deviation pursuant to DIN EN ISO 8980-2:2004;
(2) a monotonically increasing gradient of the dioptric power between distance design reference point and near design reference point on a principal line of sight; and
(3) an intermediate corridor, which is defined by virtue of the residual astigmatism lying below a value selected from the group consisting of:
(a) 0.25 diopters,
(b) 0.38 diopters, or
(c) 0.50 diopters, and wherein the front surface geometry and the back surface geometry are configured such that, compared to a substrate made of a material with a spatially non-varying refractive index of between 1.5 and 1.8, for which at least one of the optical requirements (1) to (3) is not satisfied, the spatial variation of the refractive index of the material of the substrate of the progressive power spectacle lens is configured such that all optical requirements (1) to (3) are satisfied and, wherein in relation to the substrate made of the material with the spatially non-varying refractive index of between 1.5 and 1.8, there is a reduction in the residual astigmatism to the side of the intermediate corridor such that a width of the intermediate corridor increases, wherein the width is defined by a bound of the residual astigmatism in a range between 0.25 diopters and 0.50 diopters.

2. A product comprising:
a representation of a progressive power spectacle lens situated on a non-transitory data medium as computer-readable data with instructions for the production thereof by an additive method or a representation of the progressive power spectacle lens with instructions for the production thereof by an additive method in the form of a computer-readable data signal, wherein:
the progressive power spectacle lens has a substrate with a front surface and a back surface, the substrate including a material with a spatially varying refractive index,
wherein the front surface has a front surface geometry and the back surface has a back surface geometry,
wherein at least one of the front surface geometry or the back surface geometry is a free-form surface geometry,
wherein the progressive power spectacle lens has a distance design reference point and a near design reference point,
wherein the progressive power spectacle lens is configured to satisfy the following optical requirements:
(1) a prescribed dioptric power at the distance design reference point within an admissible limit deviation pursuant to DIN EN ISO 8980-2:2004 and a prescribed dioptric power at the near design reference point within an admissible limit deviation pursuant to DIN EN ISO 8980-2:2004;
(2) a monotonically increasing gradient of the dioptric power between distance design reference point and near design reference point on a principal line of sight; and
(3) an intermediate corridor, which is defined by virtue of the residual astigmatism lying below a value selected from the group consisting of:
(a) 0.25 diopters,
(b) 0.38 diopters, or
(c) 0.50 diopters,
and wherein the front surface geometry and the back surface geometry are configured such that, compared to a substrate made of a material with a spatially non-varying refractive index of between 1.5 and 1.8, for which at least one of the optical requirements (1) to (3) is not satisfied, the spatial variation of the refractive index of the material of the substrate of the progressive power spectacle lens is configured such that all optical requirements (1) to (3) are satisfied and, wherein in relation to the substrate made of the material with the spatially non-varying refractive index of between 1.5 and 1.8, there is a reduction in the residual astigmatism to the side of the intermediate corridor such that a width of the intermediate corridor increases, wherein the width is defined by a bound of the residual astigmatism in a range between 0.25 diopters and 0.50 diopters.

3. A product comprising:
a progressive power spectacle lens having a substrate with a front surface and a back surface, the substrate including a material with a spatially varying refractive index,
wherein the front surface has a front surface geometry and the back surface has a back surface geometry,
wherein at least one of the front surface geometry or the back surface geometry is a free-form surface geometry,
wherein the progressive power spectacle lens has a distance design reference point and a near design reference point,
wherein the progressive power spectacle lens is configured to satisfy the following optical requirements:
(1) a prescribed dioptric power at the distance design reference point within an admissible limit deviation pursuant to DIN EN ISO 8980-2:2004 and a prescribed dioptric power at the near design reference point within an admissible limit deviation pursuant to DIN EN ISO 8980-2:2004;
(2) a monotonically increasing gradient of the dioptric power between distance design reference point and near design reference point on a principal line of sight; and
(3) an intermediate corridor, which is defined by virtue of the residual astigmatism lying below a value selected from the group consisting of:
(a) 0.25 diopters,
(b) 0.38 diopters, or
(c) 0.50 diopters,
wherein
wherein, in a case where the front surface of the progressive power spectacle lens has a free-form surface geometry, the free-form surface geometry of the front surface is modified in relation to a comparison progressive power spectacle lens with a same back surface geometry, with the same dioptric power profile, and with a same residual astigmatism for the spectacle beam paths through a principal line of sight and with a substrate made of a material with a spatially non-varying refractive index, which has a value that corresponds to a value of the spatially varying refractive index of the material of the substrate of the progressive power spectacle lens at the point of the principal line of sight on the front surface at which the progressive power spectacle lens with the substrate made of the material with a spatially varying refractive index experiences half of an entire dioptric power increase, and the modified free-form surface geometry of the front surface of the progressive power spectacle lens and the spatial variation of the refractive index are adapted to one another such that, for the progressive power spectacle lens, a first value of the surface astigmatism of the front surface, ascertained by calculation, at a point through which the associated spectacle wearer beam path extends through the location of the principal line of sight, at which the progressive power spectacle lens experiences half of the entire mean power increase, is greater than a second value of the surface astigmatism of the front surface with a free-form surface geometry, ascertained by calculation for the comparison progressive power spectacle lens from a material with a spatially non-varying refractive index, at the point at which the associated spectacle wearer beam path extends through the location on the principal line of sight at which this comparison progressive power spectacle lens experiences half of the entire mean power increase, or wherein, in case where the back surface of the progressive power spectacle lens has a free-form surface geometry, the free-form surface geometry of the back surface is modified in relation to the comparison progressive power spectacle lens with the same front surface geometry, with the same dioptric power profile and with the same residual astigmatism for the spectacle wearer beam paths through the principal line of sight and with a substrate made of a material with a spatially non-varying refractive index, which has a value that corresponds to the value of the spatially varying refractive index of the material of the substrate of the progressive power spectacle lens at the point of the principal line of sight on the back surface at which the progressive power spectacle lens with the substrate made of the material with a spatially varying refractive index experiences half of the entire dioptric power increase, and the modified free-form surface geometry of the back surface of the progressive power spectacle lens and the spatial variation of the refractive index are adapted to one another such that, for the progressive power spectacle lens, a first value of the surface astigmatism of the back surface, ascertained by calculation, at the point through which the associated spectacle wearer beam path extends through the location of the principal line of sight, at which this progressive power spectacle lens experiences half of the entire mean power increase, is greater than a second value of the surface astigmatism of the back surface with a free-form surface geometry, ascertained by calculation for the comparison progressive power spectacle lens from a material with the spatially non-varying refractive index, at the point at which the associated spectacle wearer beam path extends through the location on the principal line of sight at which this comparison progressive power spectacle lens experiences half of the entire mean power increase.

4. A product comprising:
a representation of a progressive power spectacle lens situated on a non-transitory data medium as computer-readable data with instructions for the production thereof by an additive method or a representation of the progressive power spectacle lens with instructions for the production thereof by an additive method in the form of a computer-readable data signal, wherein:
the progressive power spectacle lens has a substrate with a front surface and a back surface, the substrate including a material with a spatially varying refractive index,
wherein the front surface has a front surface geometry and the back surface has a back surface geometry,
wherein at least one of the front surface geometry or the back surface geometry is a free-form surface geometry,
wherein the progressive power spectacle lens has a distance design reference point and a near design reference point,
wherein the progressive power spectacle lens is configured to satisfy the following optical requirements:
(1) a prescribed dioptric power at the distance design reference point within an admissible limit deviation pursuant to DIN EN ISO 8980-2:2004 and a prescribed dioptric power at the near design reference point within an admissible limit deviation pursuant to DIN EN ISO 8980-2:2004;

(2) a monotonically increasing gradient of the dioptric power between distance design reference point and near design reference point on a principal line of sight; and (3) an intermediate corridor, which is defined by virtue of the residual astigmatism lying below a value selected from the group consisting of:
(a) 0.25 diopters,
(b) 0.38 diopters, or
(c) 0.50 diopters, wherein, in a case where the front surface of the progressive power spectacle lens has a free-form surface geometry, the free-form surface geometry of the front surface is modified in relation to a comparison progressive power spectacle lens with a same back surface geometry, with the same dioptric power profile, and with a same residual astigmatism for the spectacle beam paths through a principal line of sight and with a substrate made of a material with a spatially non-varying refractive index, which has a value that corresponds to a value of the spatially varying refractive index of the material of the substrate of the progressive power spectacle lens at the point of the principal line of sight on the front surface at which the progressive power spectacle lens with the substrate made of the material with a spatially varying refractive index experiences half of an entire dioptric power increase, and the modified free-form surface geometry of the front surface of the progressive power spectacle lens and the spatial variation of the refractive index are adapted to one another such that, for the progressive power spectacle lens, a first value of the surface astigmatism of the front surface, ascertained by calculation, at a point through which the associated spectacle wearer beam path extends through the location of the principal line of sight, at which the progressive power spectacle lens experiences half of the entire mean power increase, is greater than a second value of the surface astigmatism of the front surface with a free-form surface geometry, ascertained by calculation for the comparison progressive power spectacle lens from a material with a spatially non-varying refractive index, at the point at which the associated spectacle wearer beam path extends through the location on the principal line of sight at which this comparison progressive power spectacle lens experiences half of the entire mean power increase, or wherein, in case where the back surface of the progressive power spectacle lens has a free-form surface geometry, the free-form surface geometry of the back surface is modified in relation to the comparison progressive power spectacle lens with the same front surface geometry, with the same dioptric power profile and with the same residual astigmatism for the spectacle wearer beam paths through the principal line of sight and with a substrate made of a material with a spatially non-varying refractive index, which has a value that corresponds to the value of the spatially varying refractive index of the material of the substrate of the progressive power spectacle lens at the point of the principal line of sight on the back surface at which the progressive power spectacle lens with the substrate made of the material with a spatially varying refractive index experiences half of the entire dioptric power increase, and the modified free-form surface geometry of the back surface of the progressive power spectacle lens and the spatial variation of the refractive index are adapted to one another such that, for the progressive power spectacle lens, a first value of the surface astigmatism of the back surface, ascertained by calculation, at the point through which the associated spectacle wearer beam path extends through the location of the principal line of sight, at which this progressive power spectacle lens experiences half of the entire mean power increase, is greater than a second value of the surface astigmatism of the back surface with a free-form surface geometry, ascertained by calculation for the comparison progressive power spectacle lens from a material with the spatially non-varying refractive index, at the point at which the associated spectacle wearer beam path extends through the location on the principal line of sight at which this comparison progressive power spectacle lens experiences half of the entire mean power increase.

5. The product as claimed in claim 3, wherein the value of the first surface astigmatism ascertained by calculation
is at least 0.25 diopters greater than the value of the second surface astigmatism ascertained by calculation
or
is greater than the value of the second surface astigmatism ascertained by calculation by at least one third of the value of the near addition power.

6. The product as claimed in claim 3, wherein the value of the first surface astigmatism ascertained by calculation is greater than the value of the second surface astigmatism ascertained by calculation not only at one point but in a region along the principal line of sight, in which the progressive power spectacle lens and the comparison progressive power spectacle lens experience one quarter to three quarters of the entire dioptric power increase.

7. A computer-implemented method for designing a progressive power spectacle lens having a substrate with a front surface and a back surface, the substrate consisting of a material with a spatially varying refractive index, at least one of the front surface or the back surface having a free-form surface geometry, the progressive power spectacle lens having a distance design reference point and a near design reference point, the method comprising:
configuring the progressive power spectacle lens to satisfy the following optical requirements:
(1) a prescribed dioptric power at the distance design reference point lies within an admissible limit deviation pursuant to DIN EN ISO 8980-2:2004 and a prescribed dioptric power at the near design reference point lies within an admissible limit deviation pursuant to DIN EN ISO 8980-2:2004,
(2) a monotonically increasing gradient of the prescribed dioptric power between the distance design reference point and the near design reference point lies on a principal line of sight, and
(3) having an intermediate corridor, which is defined by virtue of a residual astigmatism lying below a value selected from the group consisting of:
(a) 0.25 diopters
(b) 0.38 diopters
(c) 0.50 diopters,
wherein the free-form surface geometry of the front surface and/or the back surface of the progressive power spectacle lens and the spatial variation of the refractive index are adapted to one another such that a comparison progressive power spectacle lens with a same geometry but based on a substrate made of a material with a spatially non-varying refractive index does not satisfy at least one of the optical requirements (1) to (3) and, in relation to the comparison progressive power spectacle lens, there is a reduction in the residual astigmatism to a side of the intermediate corridor such that a width of the intermediate corridor increases, wherein the width is defined by a bound of the residual astigmatism in the range between 0.25 diopters and 0.50 diopters.

8. A computer-implemented method for designing a progressive power spectacle lens having a substrate with a front surface and a back surface, the substrate consisting of a material with a spatially varying refractive index, at least one of the front surface or the back surface having a free-form surface geometry, the progressive power spectacle lens having a distance design reference point and a near design reference point, the method comprising:
configuring the progressive power spectacle lens to satisfy the following optical requirements:
(1) a prescribed dioptric power at the distance design reference point lies within an admissible limit deviation pursuant to DIN EN ISO 8980-2:2004 and a prescribed dioptric power at the near design reference point lies within an admissible limit deviation pursuant to DIN EN ISO 8980-2:2004,
(2) a monotonically increasing gradient of the prescribed dioptric power between distance design reference point and near design reference point lies on a principal line of sight, and
(3) having an intermediate corridor, which is defined by virtue of the residual astigmatism lying below a value from the group of:
(a) 0.25 diopters,
(b) 0.38 diopters, or
(c) 0.50 diopters,
wherein the free-form surface geometry of the front surface and/or the back surface of the progressive power spectacle lens and a spatial variation of the refractive index are adapted to one another such that, for the progressive power spectacle lens, a first value of the surface astigmatism of the surface with the free-form surface geometry, ascertained by calculation, at the point through which an associated spectacle wearer beam path extends through a location of the principal line of sight, at which the progressive power spectacle lens experiences half of an entire mean power increase, is greater than a second value of the surface astigmatism of the surface with the free-form surface geometry, ascertained by calculation for a comparison progressive power spectacle lens from a material with a spatially non-varying refractive index, at the point at which the associated spectacle wearer beam path extends through the location on the principal line of sight at which the comparison progressive power spectacle lens experiences half of the entire mean power increase, and wherein the comparison progressive power spectacle lens has a same relative position of the surface with the free-form surface geometry and the same geometry of the opposite surface, a same dioptric power profile along the principal line of sight, and the refractive index has a value which corresponds to the value of the refractive index of the substrate at the point of the principal line of sight on the front surface, at which the progressive power spectacle lens with the substrate made of the material with a spatially varying refractive index experiences half of the entire dioptric power increase.

9. A computer program having program code for carrying out all method steps as claimed in claim 7 when the computer program is loaded onto a computer and/or executed on a computer.

10. A non-transitory computer-readable medium comprising a computer program as claimed in claim 9.

11. A method for producing a progressive power spectacle lens designed according to a method as claimed in claim 7.

12. The method as claimed in claim 11, wherein the production is implemented with an additive method.

13. A computer comprising:
a processor; and
a memory in which a computer program as claimed in claim 9 is stored, the computer being configured to carry out a method of configuring the progressive power spectacle lens to satisfy the following optical requirements:
(1) a prescribed dioptric power at the distance design reference point lies within an admissible limit deviation pursuant to DIN EN ISO 8980-2:2004 and a prescribed dioptric power at the near design reference point lies within an admissible limit deviation pursuant to DIN EN ISO 8980-2:2004,
(2) a monotonically increasing gradient of the prescribed dioptric power between the distance design reference point and the near design reference point lies on a principal line of sight, and
(3) having an intermediate corridor, which is defined by virtue of a residual astigmatism lying below a value selected from the group consisting of:
(a) 0.25 diopters
(b) 0.38 diopters
(c) 0.50 diopters,
wherein the free-form surface geometry of the front surface and/or the back surface of the progressive power spectacle lens and the spatial variation of the refractive index are adapted to one another such that a comparison progressive power spectacle lens with a same geometry but based on a substrate made of a material with a spatially non-varying refractive index does not satisfy at least one of the optical requirements (1) to (3) and, in relation to the comparison progressive power spectacle lens, there is a reduction in the residual astigmatism to a side of the intermediate corridor such that a width of the intermediate corridor increases, wherein the width is defined by a bound of the residual astigmatism in the range between 0.25 diopters and 0.50 diopters.

14. The product as claimed in claim 4, wherein the value of the first surface astigmatism ascertained by calculation
is at least 0.25 diopters greater than the value of the second surface astigmatism ascertained by calculation or
is greater than the value of the second surface astigmatism ascertained by calculation by at least one third of the value of the near addition power.

15. The product as claimed in claim 4, wherein the value of the first surface astigmatism ascertained by calculation is greater than the value of the second surface astigmatism ascertained by calculation not only at one point but in a region along the principal line of sight, in which the progressive power spectacle lens and the comparison progressive power spectacle lens experience one quarter to three quarters of the entire dioptric power increase.

16. A computer program having program code for carrying out all method steps as claimed in claim 8 when the computer program is loaded onto a computer and/or executed on a computer.

17. A non-transitory computer-readable medium comprising a computer program as claimed in claim 16.

18. A method for producing a progressive power spectacle lens designed according to a method as claimed in claim 8.

19. The method as claimed in claim 18, wherein the production is implemented with an additive method.

* * * * *

UNITED STATES PATENT AND TRADEMARK OFFICE
CERTIFICATE OF CORRECTION

PATENT NO. : 11,086,142 B2
APPLICATION NO. : 17/153581
DATED : August 10, 2021
INVENTOR(S) : Gerhard Kelch, Christoph Menke and Helmut Wietschorke It is certified that error appears in the above-identified patent and that said Letters Patent is hereby corrected as shown below:

In the Specification

Column 2, Line 5, change "Optik and Technik" to -- Optik und Technik --

Column 2, Line 62, change "Optik and Technik" to -- Optik und Technik --

Column 17, Line 31, change "$n = 1.60 + \sum_{n=1}^{36} c_n Z_n(x,y)$" to -- $n = 1.60 + \sum_{n=1}^{36} c_n Z_n(x,y)$ --

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*